(12) United States Patent
Shimizu

(10) Patent No.: US 10,284,734 B2
(45) Date of Patent: May 7, 2019

(54) INFORMATION PROCESSING APPARATUS, METHOD, AND STORAGE MEDIUM FOR MANAGING AN EXECUTABLE APPLICATION

(71) Applicant: CANON KABUSHIKI KAISHA, Tokyo (JP)

(72) Inventor: Yasutomo Shimizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 14/594,212

(22) Filed: Jan. 12, 2015

(65) Prior Publication Data

US 2015/0229788 A1 Aug. 13, 2015

(30) Foreign Application Priority Data

Feb. 7, 2014 (JP) .................................. 2014-022783

(51) Int. Cl.
*H04N 1/00* (2006.01)
*G06F 3/12* (2006.01)

(52) U.S. Cl.
CPC ........... *H04N 1/00244* (2013.01); *G06F 3/12* (2013.01); *H04N 1/00464* (2013.01); *H04N 1/00856* (2013.01); *H04N 1/00973* (2013.01); *H04N 2201/0094* (2013.01)

(58) Field of Classification Search
None
See application file for complete search history.

(56) References Cited

U.S. PATENT DOCUMENTS

| 2009/0013310 A1* | 1/2009 | Arner | H04L 67/02 717/120 |
| 2012/0057183 A1* | 3/2012 | Tsujimoto | H04N 1/00204 358/1.13 |
| 2012/0265954 A1* | 10/2012 | Haustein | G06F 3/061 711/160 |
| 2015/0160988 A1* | 6/2015 | Scomparim | G06F 7/00 719/318 |

FOREIGN PATENT DOCUMENTS

| JP | 11212931 A | 8/1999 |
| JP | 2006048493 A | 2/2006 |
| JP | 2008140276 A | 6/2008 |
| JP | 2009199369 A | 9/2009 |
| JP | 2013-137612 A | 7/2013 |

OTHER PUBLICATIONS

Japanese Office Action issued in corresponding Japanese Application No. 2014-022783 dated Nov. 17, 2017.

* cited by examiner

*Primary Examiner* — Neil R McLean
*Assistant Examiner* — Pawan Dhingra
(74) *Attorney, Agent, or Firm* — Venable LLP

(57) ABSTRACT

An application storage area on an application PF stores an Intent information file including <intent> tag data in addition a cooperation destination application in application cooperation by an Intent. When a Web browser is activated, an Intent processing unit confirms with an application management unit about an active application in the application storage area. After the confirmation, the Intent processing unit acquires the Intent information file of the active application from an Intent information file storage unit and performs Intent registration.

11 Claims, 30 Drawing Sheets

F I G. 5

| | | | | |
|---|---|---|---|---|
| bundle | WebServerApplication | ApplicationA | ApplicationB | ServiceProvider |
| state | ACTIVE | ACTIVE | INSTALLED | ACTIVE |
| version | 1.0 | 1.31 | 1.0 | 2.03 |
| ... | ... | ... | ... | ... |

501 — bundle
502 — state
503 — version, ...

FIG. 6A

```
                 ┌─351
                 <intent
601 ── action="http://aaa.bbb.ccc.co.jp/print"
602 ── type="image/*"
603 ── title="print appli A"              } 600
604 ── href="http://localhost : 8000/appli A"
605 ── disposition="inline"
                 />
```

FIG. 6B

```
                 ┌─361
                 <intent
611 ── action="http://aaa.bbb.ccc.co.jp/print"
612 ── type="image/*"
613 ── title="print appli B"              } 610
614 ── href="http://localhost : 8000/appli B"
615 ── disposition="inline"
                 />
```

FIG. 6C

```
                 ┌─373
                 <intent
621 ── action="http://aaa.bbb.ccc.co.jp/print"
622 ── type="image/*"
623 ── title="print appli SP"             } 620
624 ── href="http://services.co.jp/appli SP"
625 ── disposition="inline"
                 />
```

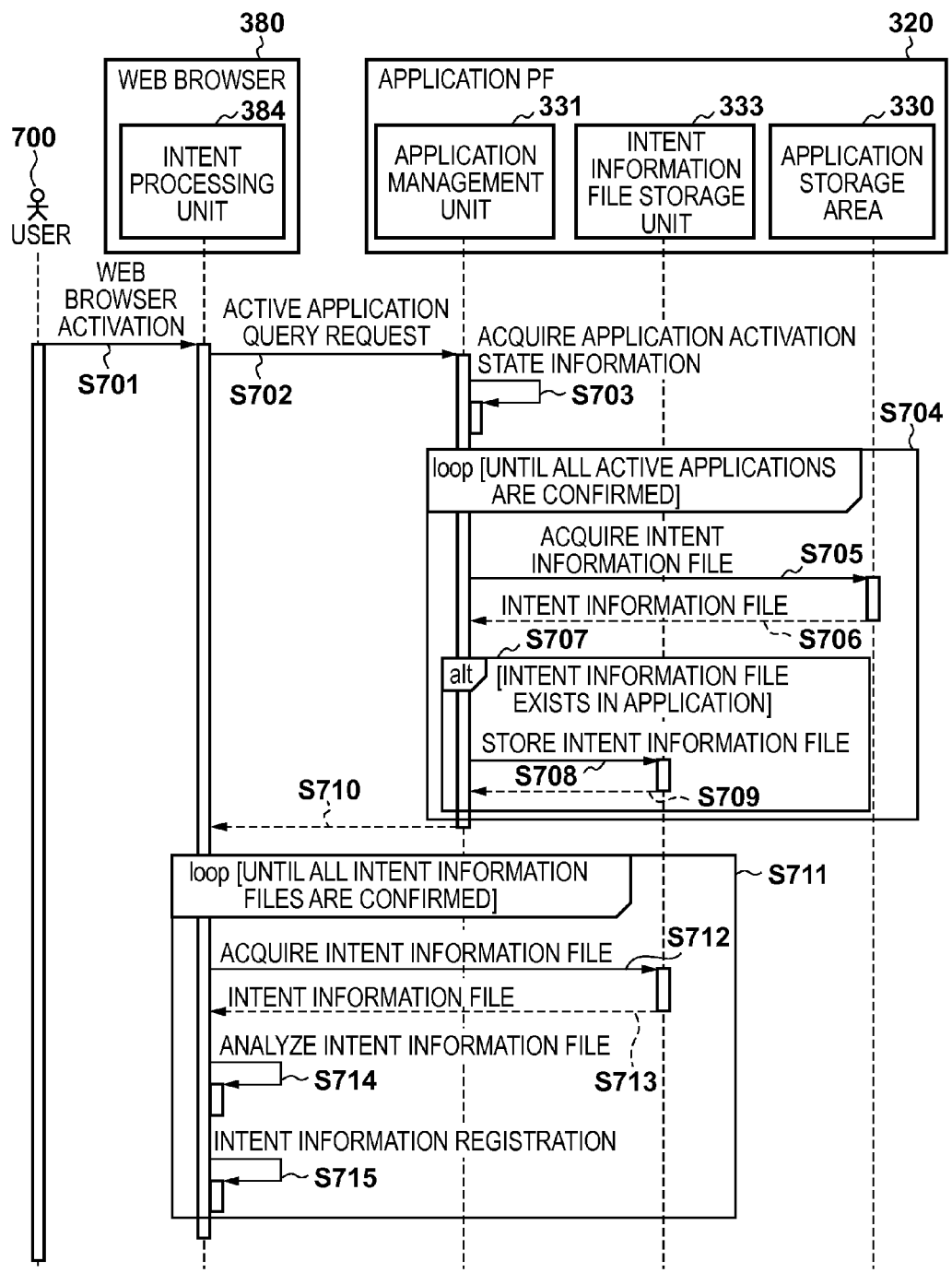

800 — INTENT INFORMATION TABLE

| | | | | |
|---|---|---|---|---|
| 801 | action | http://aaa.bbb.ccc.co.jp/print | http://aaa.bbb.ccc.co.jp/print | ... |
| 802 | type | image/* | image/* | ... |
| 803 | title | print appli A | print appli SP | ... |
| 804 | href | http://localhost:8000/appliA | http://services.co.jp/appliSP | ... |
| 805 | disposition | inline | inline | ... |

F I G. 10B
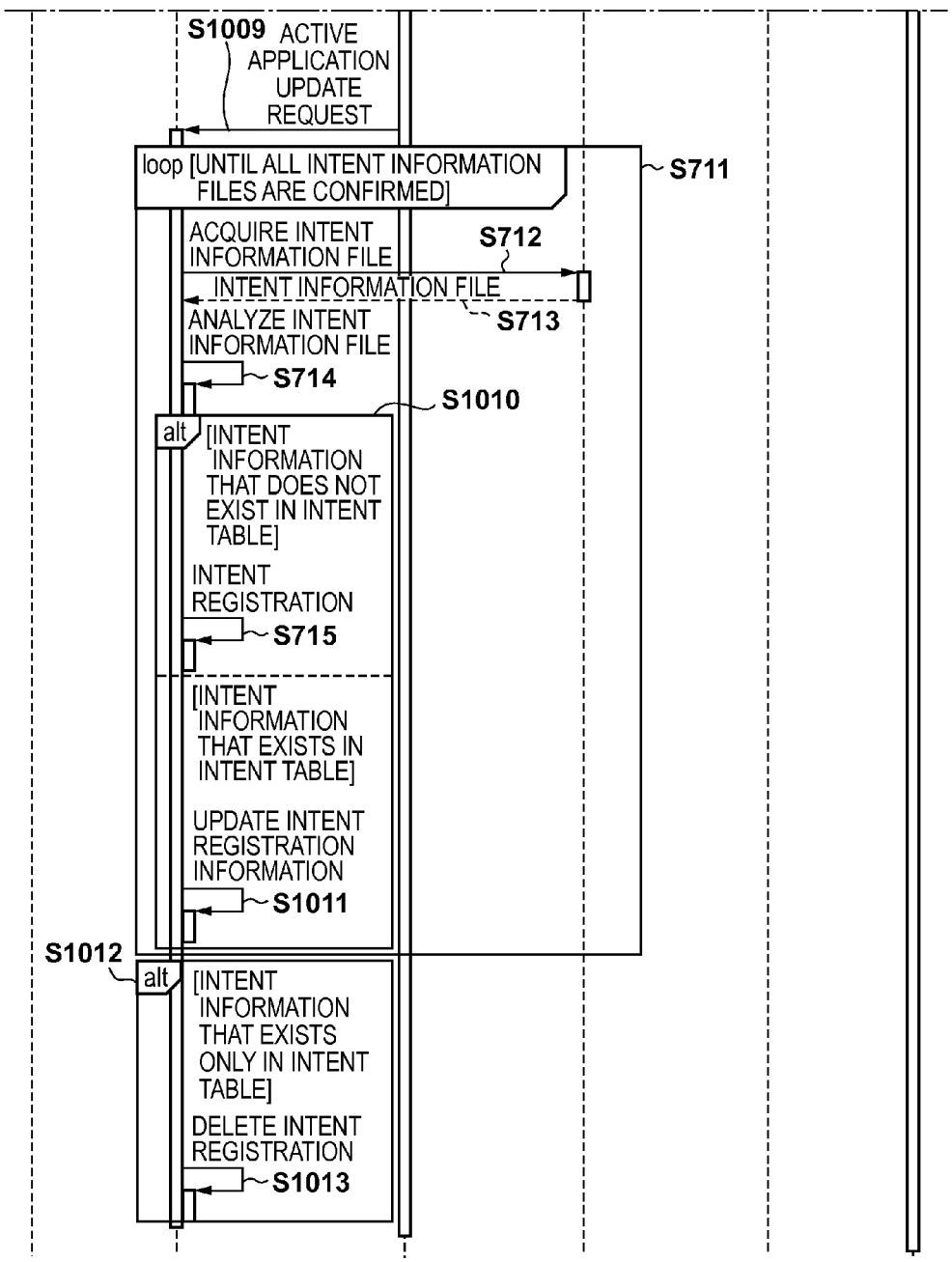

FIG. 11

800 ~ INTENT INFORMATION TABLE 1100

| | | | | |
|---|---|---|---|---|
| 801 ~ action | http://aaa.bbb.ccc.co.jp/print | http://aaa.bbb.ccc.co.jp/print | http://aaa.bbb.ccc.co.jp/print | ... |
| 802 ~ type | image/* | image/* | image/* | ... |
| 803 ~ title | print appli A | print appli B | print appli SP | ... |
| 804 ~ href | http://localhost:8000/appliA | http://localhost:8000/appliB | http://services.co.jp/appliSP | ... |
| 805 ~ disposition | inline | inline | inline | ... |

FIG. 12

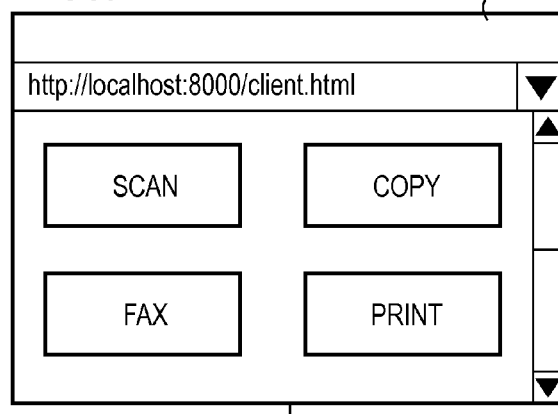

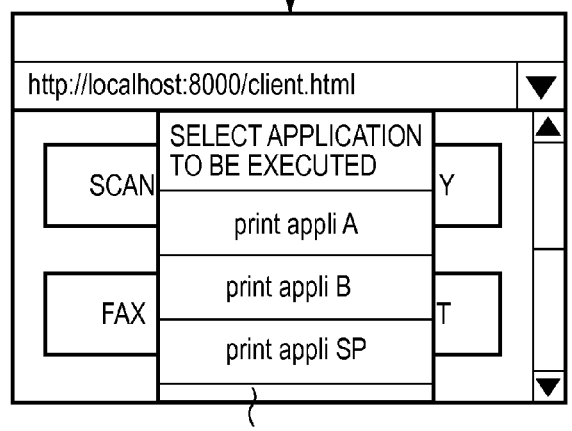

PRINT APPLICATION SELECTION SCREEN ~ 1200

800 — INTENT INFORMATION TABLE

| | | |
|---|---|---|
| 801 — action | http://aaa.bbb.ccc.co.jp/print | ... |
| 802 — type | image/* | ... |
| 803 — title | print appli A | ... |
| 804 — href | http://localhost:8000/appliA | ... |
| 805 — disposition | inline | ... |

1400 — UNUSABLE INTENT INFORMATION TABLE

| | |
|---|---|
| 1401 — action | http://aaa.bbb.ccc.co.jp/print |
| 1402 — type | image/* |
| 1403 — title | print appli SP |
| 1404 — href | http://services.co.jp/appliSP |
| 1405 — disposition | inline |

800 — INTENT INFORMATION TABLE          1700

| | | | | |
|---|---|---|---|---|
| 801 — action | http://aaa.bbb.ccc.co.jp/print | http://aaa.bbb.ccc.co.jp/print | ... |
| 802 — type | image/* | image/* | ... |
| 803 — title | print appli A | print appli SP | ... |
| 804 — href | http://localhost:8000/appliA | http://services.co.jp/appliSP | ... |
| 805 — disposition | inline | inline | ... |

1400 — UNUSABLE INTENT INFORMATION TABLE

| | |
|---|---|
| 1401 — action | |
| 1402 — type | |
| 1403 — title | |
| 1404 — href | |
| 1405 — disposition | |

F I G. 20

| bundle | WebServerApplication | LoginApplication | ApplicationA | ApplicationB | ServiceProvider | ... |
|---|---|---|---|---|---|---|
| state | ACTIVE | ACTIVE | ACTIVE | ACTIVE | ACTIVE | ... |
| version | 1.0 | 6.4 | 1.31 | 1.0 | 2.03 | ... |
| ... | ... | ... | ... | ... | ... | ... |

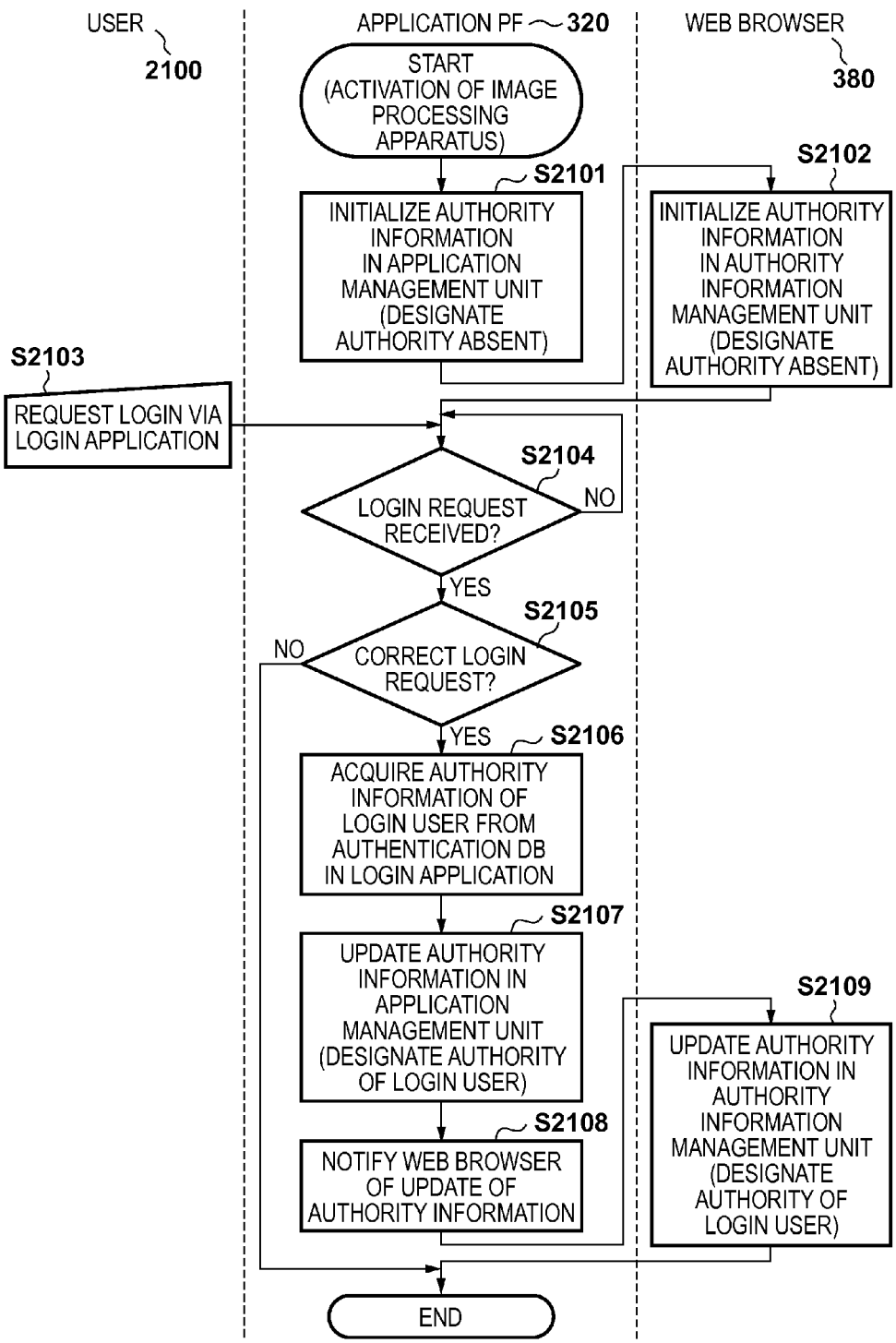

FIG. 22A

```
                    ┌─1920
                    <intent
601 ─── action="http://aaa.bbb.ccc.co.jp/print"
602 ─── type="image/*"
603 ─── title="print appli A"                        }600
604 ─── href="http://localhost : 8000/appli A"
605 ─── disposition="inline"
                    />
                    <permission
2201 ── role="Administrator"                          }2200
                    />
```

FIG. 22B

```
                    ┌─1930
                    <intent
611 ─── action="http://aaa.bbb.ccc.co.jp/print"
612 ─── type="image/*"
613 ─── title="print appli B"                        }610
614 ─── href="http://localhost : 8000/appli B"
615 ─── disposition="inline"
                    />
```

FIG. 22C

```
                    ┌─1940
                    <intent
621 ─── action="http://aaa.bbb.ccc.co.jp/print"
622 ─── type="image/*"
623 ─── title="print appli SP"                       }620
624 ─── href="http://services.co.jp/appli SP"
625 ─── disposition="inline"
                    />
                    <permission
2211 ── role="GeneralUser"                            }2210
                    />
```

800 — INTENT INFORMATION TABLE

| | | | |
|---|---|---|---|
| 801 | action | http://aaa.bbb.ccc.co.jp/print | ... |
| 802 | type | image/* | ... |
| 803 | title | print appli B | ... |
| 804 | href | http://localhost:8000/appliB | ... |
| 805 | disposition | inline | ... |
| 2400 | role | | ... |
| | ... | | ... |

1400 — UNUSABLE INTENT INFORMATION TABLE

| | | |
|---|---|---|
| 1401 | action | |
| 1402 | type | |
| 1403 | title | |
| 1404 | href | |
| 1405 | disposition | |
| 2401 | role | |
| | ... | |

2410 — AUTHORITY MISMATCH INTENT INFORMATION TABLE

| | | | |
|---|---|---|---|
| 2411 | action | http://aaa.bbb.ccc.co.jp/print | http://aaa.bbb.ccc.co.jp/print |
| 2412 | type | image/* | image/* |
| 2413 | title | print appli A | print appli SP |
| 2414 | href | http://localhost:8000/appliA | http://services.co.jp/appliSP |
| 2415 | disposition | inline | inline |
| 2416 | role | Administrator | GeneralUser |
| | ... | | |

800 — INTENT INFORMATION TABLE  2700

| | | | | |
|---|---|---|---|---|
| 801 | action | http://aaa.bbb.ccc.co.jp/print | http://aaa.bbb.ccc.co.jp/print | ... |
| 802 | type | image/* | image/* | ... |
| 803 | title | print appli B | print appli SP | ... |
| 804 | href | http://localhost:8000/appliB | http://services.co.jp/appliSP | ... |
| 805 | disposition | inline | inline | ... |
| 2400 { | role | | GeneralUser | ... |
| | ... | | | ... |

1410 — UNUSABLE INTENT INFORMATION TABLE

| | | |
|---|---|---|
| 1411 | action | |
| 1412 | type | |
| 1413 | title | |
| 1414 | href | |
| 1415 | disposition | |
| 2401 { | role | |
| | ... | |

2410 — AUTHORITY MISMATCH INTENT INFORMATION TABLE

| | | |
|---|---|---|
| 2411 | action | http://aaa.bbb.ccc.co.jp/print |
| 2412 | type | image/* |
| 2413 | title | print appli A |
| 2414 | href | http://localhost:8000/appliA |
| 2415 | disposition | inline |
| 2416 { | role | Administrator |
| | ... | |

INFORMATION PROCESSING APPARATUS, METHOD, AND STORAGE MEDIUM FOR MANAGING AN EXECUTABLE APPLICATION

BACKGROUND OF THE INVENTION

Field of the Invention

The present invention relates to an information processing apparatus which has, for example, a Web browser and can execute functional cooperation between a plurality of applications, a control method of the information processing apparatus.

Description of the Related Art

An image processing apparatus generally has an application platform (to be referred to as "PF" hereinafter) environment to perform various kinds of processing of a scanner or a printer on an application basis. A Web browser is used for display to an operation unit. A user can use the various kinds of processing of the image processing apparatus via an application activated on the application PF by operating a screen displayed on the Web browser. In recent years, intents of Android® or Web Intents of Chrome® are known as a function for performing cooperation between a plurality of applications. An application cooperation function of such a system performs an operation of transferring text data or binary data from a cooperation source application to a cooperation destination application and executing the cooperation destination application. The user or application developer creates in advance a manifest file that describes Intent information concerning cooperation destination applications and acting as a message to perform application cooperation. The manifest file is analyzed by the OS of Android® or the browser of Chrome® and registered as Intent information. The OS/browser then executes the cooperation source application. When the cooperation source application performs an operation of, for example, executing edit processing of selected image data, cooperation destination applications capable of executing the edit operation are extracted from the registered Intent information and displayed as a list. When one of the listed applications is selected, the cooperation source application transfers the selected image data to the selected cooperation destination application, and in this state, the OS/browser activates the cooperation destination application. When the image processing apparatus has this function, the user can seamlessly execute the cooperation operation of applications activated on the application PF of the image processing apparatus.

In a conventional technique (e.g., Japanese Patent Laid-Open No. 2013-137612), a terminal apparatus registers Intent information of all applications installed on the PF and automatically activates an executable application in accordance with a user operation or occurrence of a specific event. In an image processing apparatus, however, management, operation, and the like of offered functions may be performed by an administrator such as a vendor that provides the image processing apparatus. In this case, the user who uses applications on the image processing apparatus and the administrator who manages the life cycle and the like of the applications on the PF separately exist. Even for an application stopped by the administrator due to the operation or event occurrence, Intent information may be registered, and the application may be forcibly made executable. This may result in troubles for the administrator in managing and operating the application. The user may also use the application intentionally stopped by the administrator.

SUMMARY OF THE INVENTION

The present invention provides a mechanism that registers Intent information according to the activation states of applications on an image processing apparatus while using a (Web) application cooperation technology represented by Web Intents for instance, thereby allowing only applications executable even in operation to be selected.

The present invention has the following arrangement. That is, an information processing apparatus including a platform on which at least one application can operate, the platform comprising: an acquisition unit that acquires an operation situation of the application; and a management unit that manages function information concerning a service provided by the application in accordance with the operation situation, wherein the service is executed in accordance with the operation situation upon receiving a call of the service using the function information by a call source system.

According to the present invention, it is possible to provide a mechanism capable of solving the above-described problem while using the (Web) application cooperation technology.

More specifically, it is possible to register Intent information of only executable applications in correspondence with the application management method of an image processing apparatus whose administrator and user exist separately. It is also possible to implement an application cooperation function that is safe even for the user.

Further features of the present invention will become apparent from the following description of exemplary embodiments with reference to the attached drawings.

BRIEF DESCRIPTION OF THE DRAWINGS

FIG. 5 is a view showing the application management table of the application PF according to the first embodiment;

FIGS. 6A, 6B, and 6C are views showing Intent information files according to the first embodiment;

FIG. 7 is a sequence chart showing the Intent registration processing procedure of a Web browser according to the first embodiment;

FIGS. 10A and 10B show a sequence chart of the Intent registration update processing procedure of a Web browser according to the second embodiment;

FIG. 11 is a view showing the arrangement of an Intent table in the Web browser according to the second embodiment;

FIG. 12 is a view showing an example of a client application executed on the Web browser according to the second embodiment;

FIG. 14 is a view showing the arrangement of an Intent table in the Web browser according to the third embodiment;

FIG. 17 is a view showing the arrangement of the updated Intent table in the Web browser according to the third embodiment;

FIG. 20 is a view showing the application management table of an application PF according to the fourth embodiment;

FIG. 21 is a flowchart showing user authority transition using a login application according to the fourth embodiment;

FIGS. 22A, 22B, and 22C are views showing Intent information files according to the fourth embodiment;

FIG. 24 is a view showing the arrangement of an Intent table in the Web browser according to the fourth embodiment;

FIG. 27 is a view showing the arrangement of the Intent table in the Web browser in a user login state according to the fourth embodiment.

DESCRIPTION OF THE EMBODIMENTS

Embodiments of the present invention will now be described with reference to the accompanying drawings. Terms used in the embodiments will be defined first.

Intent information is information used, when a Web browser has accessed a Web application, to recognize the Web application as an Intent-processable application and register it in the Web browser as a cooperation destination application. The Intent information has <intent> tag data described in HTML data of a cooperation destination Web application when performing application cooperation using Web Intents. The Intent information can also be regarded as function information concerning a service provided by an application, and is stored and managed in an Intent information file storage unit by an application platform (PF) (to be described later).

A Web application is application software that operates on a Web browser and is used via a network such as the Internet or an intranet. In the embodiments, the Web application is an application that has a UI display screen function of operating an image processing apparatus via the Web browser, and changes the display screen or executes the device function of the image processing apparatus in accordance with a user input. The Web application is an Intent-processable application and serves as a cooperation destination Web application (that is, called side) when performing application cooperation using Web Intents.

A client application is a Web application having a UI display screen function of operating an image processing apparatus via a Web browser. The client application has an Intent execution function of displaying executable applications corresponding to a function designated by a user operation from Intent information registered in the Web browser and executing an application selected from the list by the user. That is, the client application corresponds to the above-described cooperation source application (in other words, calling side).

Note that in the embodiments, a case where Web Intents is used as a (Web) application cooperation technology will be explained. However, any other mechanism for allowing a client and a service to cooperate via a similar relay function may be used. For example, a technology used as Web Activities may be used. The present invention can be implemented using similar unique specifications. In this case, a procedure or data using the protocol of Web Intents is replaced with a procedure or data using a protocol defined by the similar technology.

[First Embodiment]
<Arrangement of Information Processing System>

Figure 1:
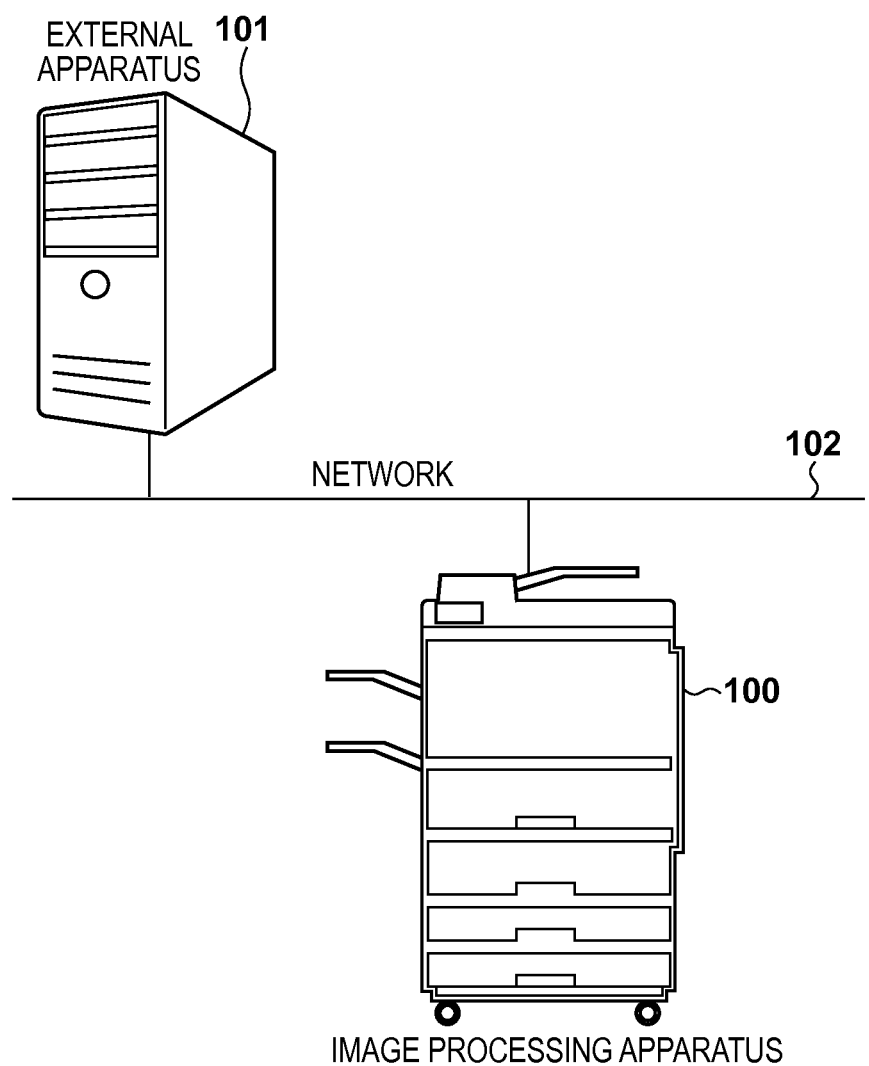
FIG. 1 is a view showing the arrangement of a system according to the first embodiment.

The arrangement of a system according to this embodiment will be described with reference to FIGS. 1 to 3. FIG. 1 shows an example of the arrangement of an entire information processing system according to this embodiment. This system includes an information processing apparatus 100 and an external apparatus 101 connected via a network 102.

The image processing apparatus 100 is an apparatus having various kinds of image processing functions such as an image forming function, an image reading function, and an image transmission function, and a Web browser function of performing HTTP communication via the network. Note that the image processing apparatus 100 can be a printer, a copying machine, a facsimile apparatus, a scanner, or an MFP (Multi Functional Peripheral) that implements the plurality of functions in a single cabinet.

The external apparatus 101 is an information processing apparatus such as a computer in which a Web application having a Web server function and a function of providing GUI data to the image processing apparatus 100 as screen information is installed.

Note that the image processing apparatus 100 and the external apparatus 101 are illustrated as separate apparatuses. However, the image processing apparatus 100 may have the functions of the external apparatus 101.

Figure 2:
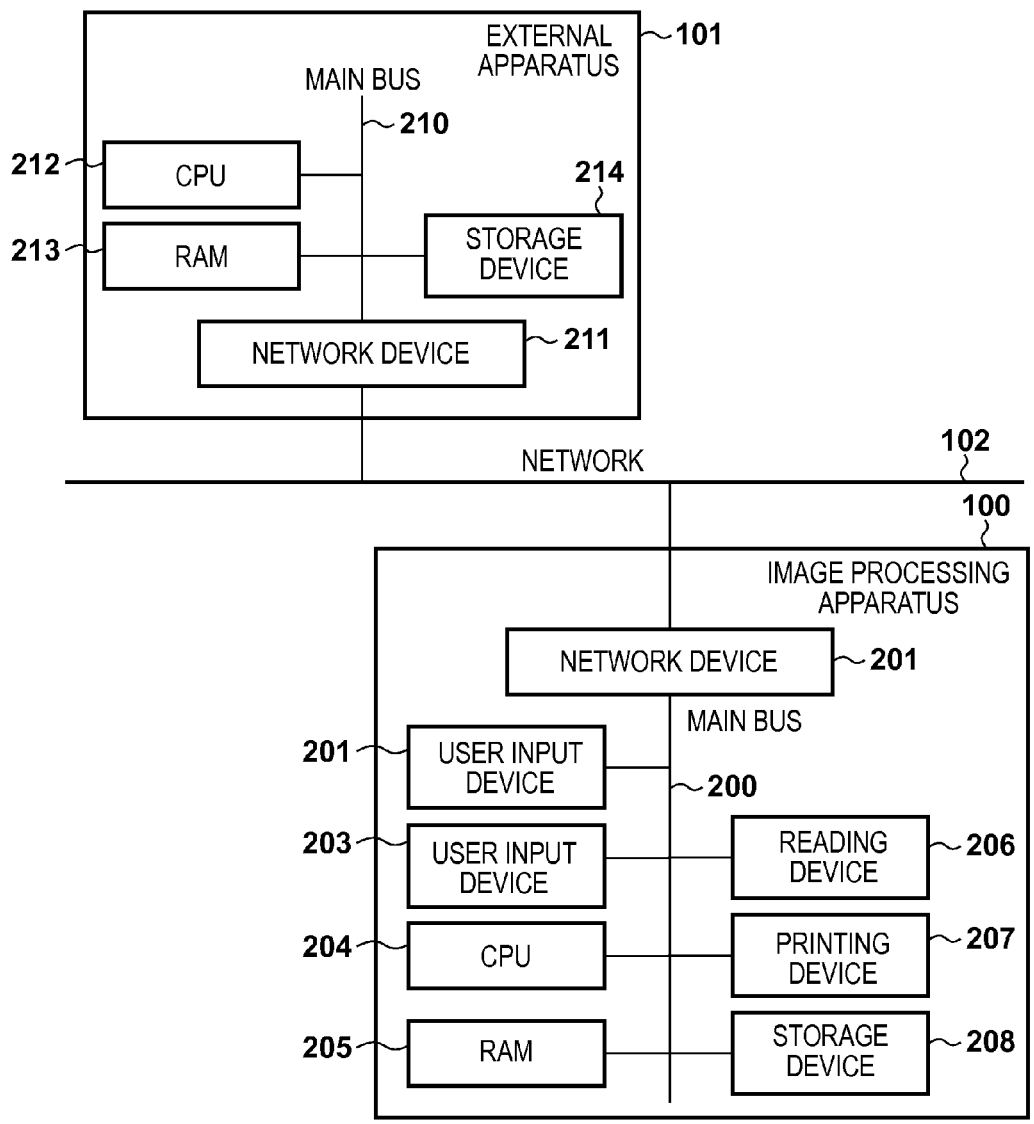
FIG. 2 is a block diagram showing the hardware arrangements of an external apparatus and an image processing apparatus according to the first embodiment.

FIG. 2 shows an example of the hardware arrangements of the external apparatus and the image processing apparatus according to this embodiment. The image processing apparatus 100 includes a network device 201 that communicates with the external apparatus 101 and the like, a user input device 202 such as a keyboard that accepts a user operation, and a UI display device 203 such as a liquid crystal display that displays an operation screen. The image processing apparatus 100 also includes a CPU 204 that controls the entire apparatus, a RAM 205 that provides the work space of the CPU 204, a reading device 206 that reads an image original, a printing device 207 that prints image data, and a storage device 208 that stores various kinds of control programs and the like. Note that the devices included in the image processing apparatus 100 are connected by a main bus 200 so as to mutually transmit/receive data. Note that the user input device 202 and the UI display device 203 are illustrated as separate devices. However, these devices may be integrated to form an operation unit.

The external apparatus 101 includes a network device 211 that communicates with the image processing apparatus 100 and the like, a CPU 212 that controls the entire apparatus, a RAM 213 that provides the work space of the CPU 212, and a storage device 214 that records various kinds of control programs and the like. The devices included in the external apparatus 101 are connected by a main bus 210 so as to mutually transmit/receive data.

Figure 3:
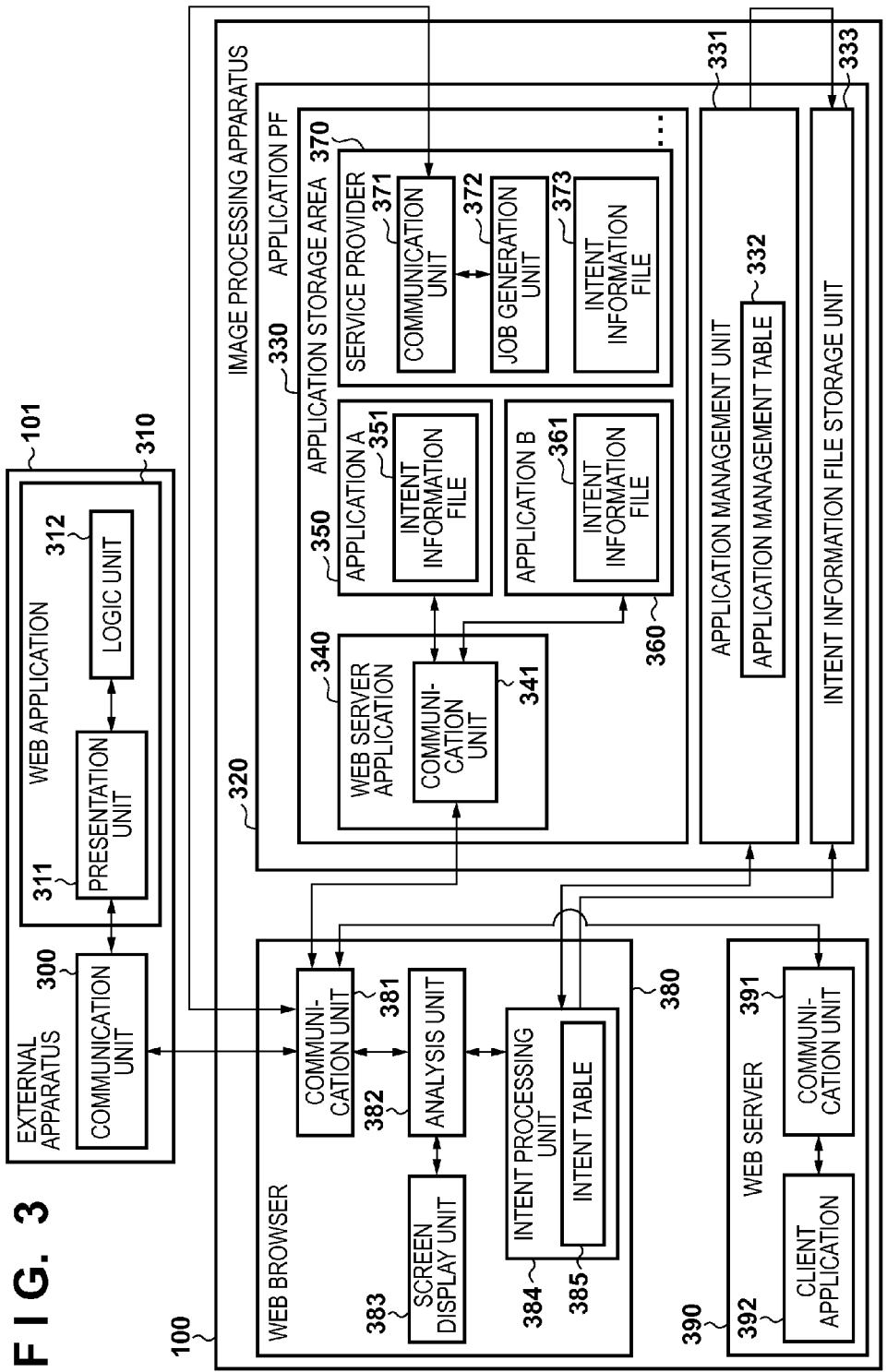
FIG. 3 is a block diagram showing the software configurations of the external apparatus and the image processing apparatus according to the first embodiment.

FIG. 3 shows an example of the software configurations of the external apparatus 101 and the image processing apparatus 100 according to this embodiment. Each functional unit shown in FIG. 3 is implemented by causing the CPU 204/CPU 212 of the image processing apparatus 100/external apparatus 101 to read out a control program stored in the storage device 208/storage device 214 onto the RAM 205/RAM 213 and execute it.

Software of the external apparatus 101 will be described first. The external apparatus 101 includes a communication unit 300 and a Web application 310. The Web application 310 includes a presentation unit 311 and a logic unit 312. The communication unit 300 is software that performs HTTP communication by controlling the network device 211. In response to a request from the image processing apparatus 100, the presentation unit 311 transmits an operation screen to be displayed on a Web browser 380 of the image processing apparatus 100 to the image processing apparatus 100 as a response via the communication unit 300. The presentation unit 311 also receives information input by the user via the operation screen displayed on the Web browser 380 from the image processing apparatus 100 via the communication unit 300.

The logic unit 312 performs processing for the input information from the image processing apparatus 100 which is transferred from the presentation unit 311. For example, the logic unit 312 generates a processing request to change the display screen or execute the device function of the image processing apparatus 100 in accordance with a user input. Note that in this embodiment, SOAP is used for the processing request. However, the implemented arrangement is not limited as long as the protocol calls data or a service in another apparatus.

Software of the image processing apparatus 100 will be described next. The image processing apparatus 100 includes an application platform (application PF) 320, the Web browser 380, and a Web server 390.

The application PF 320 is an execution platform that controls the image processing apparatus 100 via a control API and can execute one or more applications. The application PF 320 includes an application storage area 330, an application management unit 331, and an Intent information file storage unit 333 as the execution platform. Note that in this embodiment, a Java® virtual machine capable of executing a Java® application is used to form the application PF 320.

The application storage area 330 has applications stored in the storage device 208 and installed via the application management unit 331. In this embodiment, a Web server application 340, an application A 350, an application B 360, a service provider 370, and the like are installed.

The application management unit 331 installs/uninstalls applications in the application storage area 330, and manages the life cycle of each application in that area, including activation, stop, and update. The application management unit 331 also includes an application management table 332 that stores the application information of each application in the application storage area 330 and an activation state (also referred to as an operation state) for managing the life cycle.

Note that in this embodiment, the application management unit 331 includes the OSGi® framework. That is, the applications in the application storage area 330 operate on the OSGi® framework.

The OSGi® framework provides a module system, a Java® service PF, and an environment capable of executing installation, start, stop, and the like of an application without reactivating a Java® virtual machine. The OSGi® framework manages applications on a bundle basis. A bundle includes a manifest file (not shown) that describes metadata such as an application name, version information, and execution class upon bundle activation in addition to a Jar file included in an application. The metadata information in the manifest file is stored as application information managed in the above-described application management table 332.

Note that a Java® virtual machine capable of executing a Java® application is used in the application PF 320. For this reason, the application management unit 331 performs life cycle management using OSGi®. However, the implemented arrangement is not limited as long as the application PF can execute life cycle management for explicitly performing activation and stop of an application.

Figure 4A:
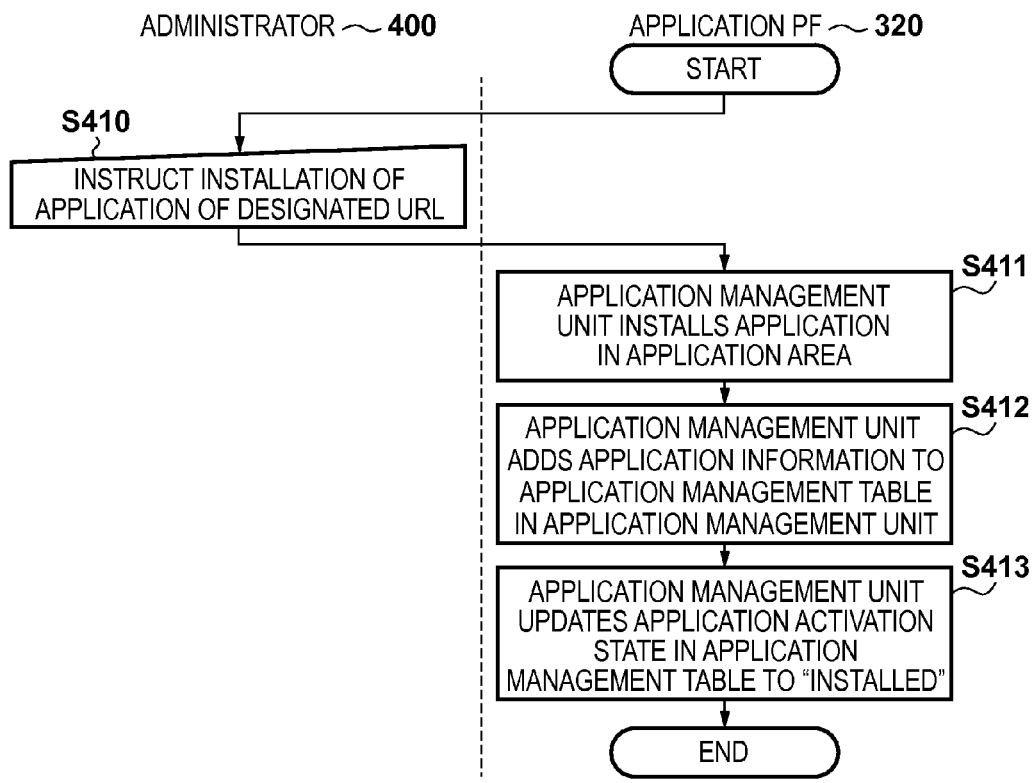
FIGS. 4A, 4B, and 4C are flowcharts showing application life cycle management of the application PF of the image processing apparatus according to the first embodiment.
Figure 4B:
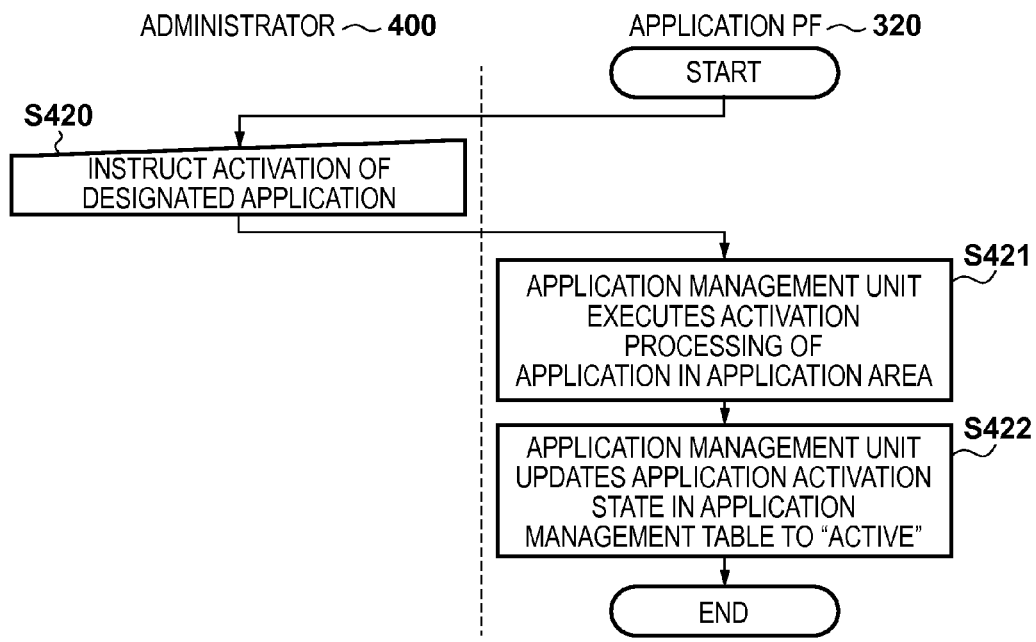
Figure 4C:
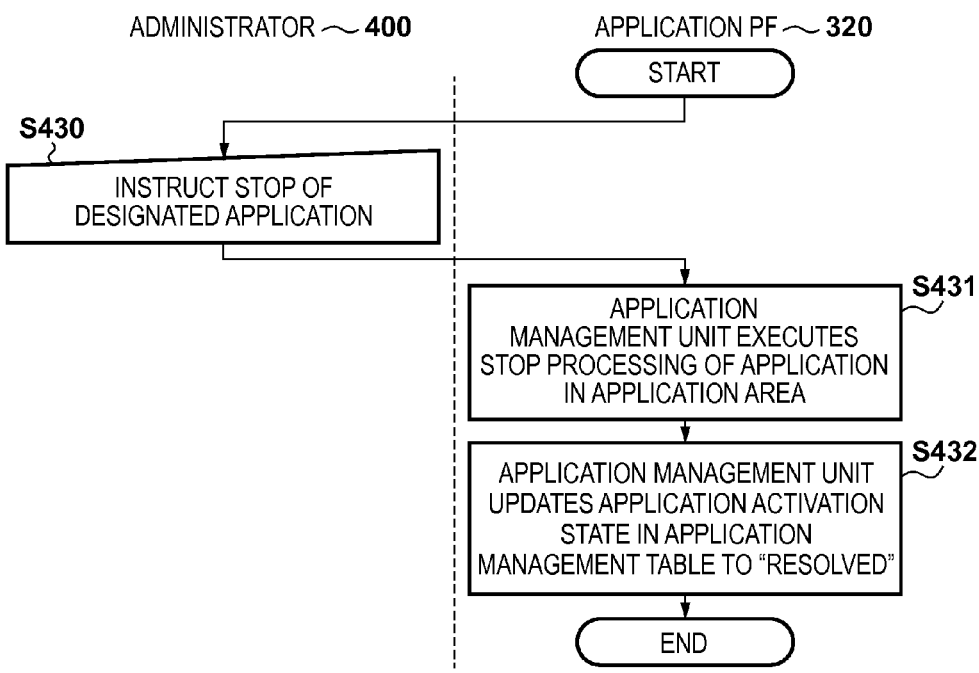

Note that the application life cycle management method of the application management unit 331 will be described later with reference to FIGS. 4A, 4B, and 4C, and the arrangement of the application management table 332 will be described later with reference to FIG. 5.

The application management unit 331 also transmits/receives a control request associated with an update of the Intent information file storage unit 333 and an Intent table 385 to/from an Intent processing unit 384. In response to the control request, the application management unit 331 stores, in the Intent information file storage unit 333, an Intent information file included in an application on the application storage area 330.

The Intent information file storage unit 333 includes the Intent information file of each application stored in the application storage area 330 by the application management unit 331. The structure of the Intent information file will be described later with reference to FIGS. 6A, 6B, and 6C.

The arrangements of applications in the application storage area 330 will be described next. Note that since the OSGi® framework is used, the applications form a bundle having a manifest file (not shown) that describes the metadata of the applications. The Web server application 340 is an application that is formed from a communication unit 341 and performs HTTP communication by controlling the network device 201.

Each Web application existing in the application storage area 330 can receive a request from another apparatus or transmit a response via the Web server application 340. The application A 350 and the application B 360 are applications that include Intent information files 351 and 361, respectively, and control the image processing apparatus 100. Note that in this embodiment, the application A 350 and the application B 360 are applications that control the printing device 207. The application A 350 and the application B 360 are also Web applications formed by Java® Servlet and perform HTTP communication via the Web server application 340.

The service provider 370 is an application that includes a communication unit 371, a job generation unit 372, and an Intent information file 373, and communicates with the Web application 310 that generates a UI screen and a processing request.

The communication unit 371 receives a processing request by SOAP, which is generated by the logic unit of the Web application 310 and communicated via the communication unit 300/communication unit 381.

The job generation unit 372 receives the processing request accepted by the communication unit 371 and generates a job to execute requested processing. Note that in this embodiment, the job generation unit 372 generates a job to execute a printer function using the printing device 207.

In this embodiment, Web applications by Java® Servlet and applications that cooperate with Web applications by SOAP communication are used as Web applications having Intent information files. The Web server application 340 and the Web application 310 are used as the use form of the applications that cooperate. However, the embodiment is not limited as long as the applications have an arrangement executable from the Web browser.

The Web browser 380 includes the communication unit 381, an analysis unit 382, a screen display unit 383, the Intent processing unit 384 and the Intent table 385.

The communication unit 381 is software that performs HTTP communication via the network device 201.

The analysis unit 382 interprets data acquired via the communication unit 381.

The screen display unit 383 displays a display screen via the UI display device 203 using the data interpreted by the analysis unit 382.

The Intent processing unit 384 processes Intent information existing the data interpreted by the analysis unit 382 and registers it in the Intent table 385. If the data interpreted by the analysis unit 382 includes Intent information request processing, the Intent processing unit 384 acquires Intent information existing in the Intent table 385 and transmits it to the analysis unit 382. In addition, the Intent processing unit 384 processes Intent information in an Intent information file existing in the Intent information file storage unit 333 and registers it in the Intent table 385. The Intent processing unit 384 also transmits/receives a control request associated with an update of the Intent information file storage unit 333 and the Intent table 385 to/from the application management unit 331.

The Intent table 385 is an aggregate of tables including Intent information of Web applications, which is stored in the storage device 208 by the Intent processing unit 384. The arrangement of the Intent table 385 will be described later with reference to FIG. 8.

The Web server 390 includes a communication unit 391 and a client application 392.

The communication unit 391 is software that performs HTTP communication by controlling the network device 201.

The client application 392 is a Web application that has a screen display function of operating the image processing apparatus 100 via the Web browser 380 on the UI display device 203. The client application 392 also has an Intent execution function of acquiring applications capable of executing a function designated by a user operation from the table of Intent information registered in the Intent table 385, displaying the applications, and executing an application selected from the display by the user. The client application 392 is formed from JavaScript® having an API capable of creating and transmitting/receiving HTML data and a message of Intent information.

Note that the implemented arrangement is not limited as long as the client application 392 is a Web application having at least the above arrangement. The client application 392 is not limited to a Web application provided in the Web server 390, and may be provided in the external apparatus 101.

<Application Life Cycle Management by Application PF 320>

The life cycle management method of the application PF 320 according to this embodiment and the management information of applications will be described with reference to FIGS. 4A, 4B, 4C, and 5. FIGS. 4A, 4B, and 4C are flowcharts showing life cycle management of the application PF 320.

Application installation processing (steps S410 to S413) shown in FIG. 4A will be described first.

In step S410, an administrator 400 of the image processing apparatus 100 inputs an instruction to request installation of a designated application on the application PF 320. Note that since the application management unit 331 uses the OSGi® framework, the request instruction of the administrator 400 is implemented by, for example, execution processing of the request command by the application management unit 331. However, the interface to be used is not limited if as long as it allows the administrator 400 to input the request instruction to the application PF 320.

In step S411, the application management unit 331 installs the application designated by the request instruction on the application storage area 330. Note that the designated application is stored in a directory under the application storage area 330, which is linked to metadata information such as an application name and an application ID.

In step S412, the application management unit 331 adds application information to the application management table 332. Note that the application information is metadata information such as an application name described in a manifest file.

In step S413, the application management unit 331 updates the activation state of the application in the application management table 332 to "INSTALLED".

Application activation processing (steps S420 to S422) shown in FIG. 4B will be described next.

In step S420, the administrator 400 of the image processing apparatus 100 transmits an activation request instruction of a designated application to the application PF 320.

In step S421, the application management unit 331 executes processing of activating the application on the application storage area 330 designated by the request instruction.

In step S422, the application management unit 331 updates the activation state of the application in the application management table 332 to "ACTIVE".

Application stop processing (steps S430 to S432) shown in FIG. 4C will be described next.

In step S430, the administrator 400 of the image processing apparatus 100 transmits a stop request instruction of a designated application to the application PF 320.

In step S431, the application management unit 331 executes processing of stopping the application on the application storage area 330 designated by the request instruction.

In step S432, the application management unit 331 updates the activation state of the application in the application management table 332 to "RESOLVED".

When the administrator 400 of the image processing apparatus 100 transmits an update or uninstallation request instruction in the same way, the application management unit 331 executes update or uninstallation processing (not shown). The outline will be described below.

Upon receiving a designated application update request from the administrator 400 of the image processing apparatus 100, the application management unit 331 performs processing of overwriting the application file on the application storage area 330.

Upon receiving a designated application uninstallation request from the administrator 400, the application management unit 331 performs processing of deleting the application file on the application storage area 330. After that, the application management unit 331 updates the activation state of the application in the application management table 332 to "UNINSTALLED".

<Application Management Table>

FIG. 5 is a view showing the arrangement of the application management table 332 according to this embodiment. The application management table 332 manages a bundle 501, a state 502, and application information 503.

The bundle 501 represents the name of each application existing on the application storage area 330. In this embodiment, the Web server application 340 is registered as "WebServerApplication". Similarly, the application A 350 is registered as "ApplicationA", the application B 360 is registered as "ApplicationB", and the service provider 370 is registered as "ServiceProvider".

The state 502 represents the activation state of each application described in the bundle 501. In this embodiment, the Web server application 340, the application A 350, and the service provider 370 are activated (ACTIVE). The application B 360 is installed but not activated (INSTALLED).

The application information 503 represents metadata information described in the manifest file of each application described in the bundle 501. In this embodiment, version information of each application and the like are described.

<Intent Information File>

The arrangement of the Intent information file of an application on the application storage area 330 will be described with reference to FIGS. 6A, 6B, and 6C.

FIG. 6A shows an example of the arrangement of the Intent information file 351 held by the application A 350 according to this embodiment.

The Intent information file 351 includes <intent> tag data 600 described above.

The <intent> tag data 600 includes action 601, type 602, title 603, href 604, and disposition 605 as data items.

The action 601 is a URL schema representing an operation provided by the application A 350. When the user selects and requests an operation such as data editing or storage processing, the client application 392 determines, using the action 601 as a key, whether an application can execute the selected operation. In this embodiment, the action of a print function is designated.

The type 602 represents a data format that the application A 350 can handle. When the application A 350 is executed via the client application 392, data that the application A 350 can exchange with the client application 392 is decided by the type 602. In this embodiment, "image/*" is set to designate handling images of every format using MIME type.

The title 603 represents the title of the application A 350. When the client application 392 displays a list of applications capable of executing an operation selected and requested by the user, the application A 350 is displayed as an application having, as its title, a character string described in the title 603.

The href 604 represents the URL of the application A 350. When the application A 350 is selected via the client application 392, the client application 392 executes the application of the URL described in the href 604.

The disposition 605 represents the display form of the application A 350. When the application A 350 is selected via the client application 392, the display method of the application A 350 on the Web browser 380 is decided by the disposition 605. In this embodiment, "inline", that is, displaying the application A 350 on the screen where the client application 392 is being executed is designated.

FIG. 6B shows an example of the arrangement of the Intent information file 361 held by the application B 360 according to this embodiment. Note that the Intent information file 361 provides the same functions as the Intent information file 351, and only title 613 and href 614 represent the application B 360.

FIG. 6C shows an example of the arrangement of the Intent information file 373 held by the service provider 370 according to this embodiment. Note that the Intent information file 373 provides the same functions as the Intent information file 351, and only the designations of title 623 and href 624 represent the Web application 310 that cooperates with the service provider 370.

<Intent Registration Processing>

Intent registration processing to the Web browser 380 according to this embodiment will be described next with reference to FIGS. 7 to 9. FIG. 7 is a sequence chart showing the Intent registration processing procedure of the Web browser 380.

In step S701, when a user 700 presses a button (not shown) on the user input device 202 to activate the Web browser 380, the image processing apparatus 100 executes a program that activates the Web browser 380. The image processing apparatus 100 executes processing concerning the Intent processing unit 384 in the activation processing program of the Web browser 380.

In step S702, the Web browser 380 transmits a request to confirm active applications to the application PF 320 via the Intent processing unit 384. That is, the Web browser 380 requests the operation situations of the applications. The application PF 320 receives the confirmation request via the application management unit 331.

In step S703, the application management unit 331 acquires information of applications that exist on the application storage area 330 and are active. That is, the application management unit 331 acquires the operation situations of the applications. More specifically, the application management unit 331 confirms the state 502 in the application management table 332 and acquires the bundle 501 and the application information 503 of applications in the "ACTIVE" state.

In step S704, the application management unit 331 performs an Intent information file confirmation operation for all active applications based on the registered information, and if confirmed, executes steps S705 and S706.

In steps S705 and S706, the application management unit 331 performs processing of acquiring an Intent information file included in each application existing on the application storage area 330. That is, the application management unit 331 acquires Intent information files included in the applications that are operating.

If the Intent information file can be acquired in step S707, the application management unit 331 executes steps S708 and S709.

In steps S708 and S709, the acquired Intent information file is stored in the Intent information file storage unit 333. More specifically, based on the bundle 501 and the application information 503 of the application whose state 502 is "ACTIVE", the application management unit 331 performs processing of searching for the directory of the application linked to the information.

If confirmation and storage of the Intent information file have ended for all active applications in step S704, the application PF 320 returns the end of the request to the Web browser 380 in step S710. The Web browser 380 receives the return via the Intent processing unit 384.

In step S711, the Web browser 380 performs Intent information file registration processing for all Intent information files existing in the Intent information file storage unit 333. More specifically, the processes of steps S712 to S715 are performed as the process of step S711.

In steps S712 and S713, the Web browser 380 acquires an Intent information file in the Intent information file storage unit 333 via the Intent processing unit 384.

In step S714, the Web browser 380 analyzes <intent> tag data described in the Intent information file via the Intent processing unit 384. In step S715, the analyzed data items are registered in a table of the Intent table 385 in the Intent processing unit 384. The registered data is also referred to as intent information.

When the process of step S715 is completed, and the remaining processes of the activation processing program of the Web browser 380 are completed, the image processing apparatus 100 activates the Web browser 380 and displays a screen via the UI display device 203.

Figures 8, 9:
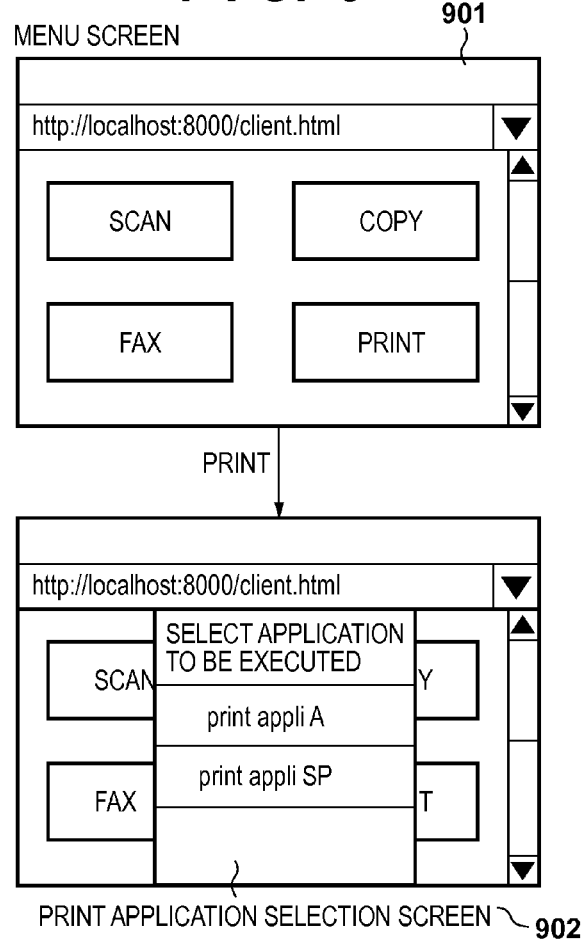
FIG. 8 is a view showing the arrangement of an Intent table in the Web browser according to the first embodiment.
FIG. 9 is a view showing an example of a client application executed on the Web browser according to the first embodiment.

FIG. 8 is a view showing the arrangement of the Intent table 385 after execution of the Intent registration processing to the Web browser 380 by the sequence of FIG. 7.

The Intent table 385 includes an Intent information table 800 that manages registered Intent information. The Intent information table 800 includes action 801, type 802, title 803, href 804, and disposition 805 that are data items described in <intent> tag data.

In this embodiment, based on the application management table shown in FIG. 5 and the execution result of the sequence processing shown in FIG. 7, the Intent table 385 holds the Intent information of applications that are active and have Intent information files. That is, the Intent table 385 holds the Intent information of the application A 350, the service provider 370, and the like. The Intent information of the application B 360 that has an Intent information file but is inactive does not exist in the Intent information file storage unit 333 and is therefore not registered in the Intent table 385. Similarly, the Intent information of the Web server application 340 that is active but has no Intent information file does not exist in the Intent information file storage unit 333 and is therefore not registered in the Intent table 385.

<Example of Screen Transition in Application Cooperation>

FIG. 9 shows an example of the arrangement and an example of screen transition of the client application 392 executed when the Web browser 380 according to this embodiment performs application cooperation using an Intent. Each screen shown in FIG. 9 is a UI screen of the client application 392 displayed on the UI display device 203 by the Web browser 380. After activating the Web browser 380, the user transmits a communication request from the Web browser 380 to the client application 392. The Web browser 380 receives HTML data as a response from the Web server 390 and interprets the received data by the analysis unit 382, thereby displaying the screen on the UI display device 203 via the screen display unit 383. The screens will be described below.

A menu screen 901 is displayed when the client application 392 is executed on the Web browser 380 and used to select a function of the image processing apparatus 100 to be used. When a function is selected on the screen, the client application 392 refers to the information registered in the Intent information table 800 of the Intent table 385, and displays applications having the action 801 corresponding to the selected function.

In this embodiment, the client application 392 includes HTML data that forms a screen to select functions such as scan, copy, fax, and printer. The client application 392 also includes JavaScript® having an API that can display usable applications from the information registered in the Intent information table 800 of the Intent table 385 in accordance with the selected function and execute data transmission/reception to/from a cooperation destination application via the Intent.

When the user presses, for example, the printer button on the menu screen 901 to select the printer function, the Web browser 380 makes a transition to a print application selection screen 902.

The print application selection screen 902 displays a list of applications capable of executing the printer function. In this embodiment, the client application 392 queries the Web browser 380 about applications whose action is registered as "http://aaa.bbb.ccc.co.jp/print" in the Intent information table 800.

The Web browser 380 returns the Intent registration information of applications that match the action to the client application 392.

The client application 392 constitutes the print application selection screen 902 from the data items of the Intent information corresponding to the action.

As described above, according to the first embodiment, in Intent registration processing for execution of the application cooperation function, only applications that are active on the application PF 320 can undergo Intent registration. More specifically, this is implemented by causing each application to have an Intent information file and causing the Web browser 380 to request the application PF 320 to confirm the active applications and acquires the Intent information files. It is therefore possible to execute the application cooperation function in correspondence with the application management method of the image processing apparatus 100 and also safely even for the user.

Note that the Intent registration method for each application on the application PF 320 used as a cooperation destination application by Intent information is not limited to the registration means of this embodiment. That is, like application cooperation using Web Intents, the cooperation destination application may include <intent> tag data serving as Intent information in formed HTML data. In this case, the user can access the application using a Web browser capable of interpreting the Intent information and register the Intent information based on the <intent> tag data.

[Second Embodiment]

The second embodiment of the present invention will be described next. In the arrangement according to the first embodiment, the activation state of an application may be changed by the administrator during activation of the Web browser 380 by the user. At this time, Intent registration information in the Web browser 380 needs to be updated by, for example, excluding a stopped application from the Intent registration and newly performing Intent registration of an activated application. In the second embodiment, processing of requesting a Web browser 380 to do an update when the activation state of an application on an application PF 320 has changed is added. This will be described below with reference to FIGS. 10 to 12.

<Intent Registration Update Processing of Web Browser>

Figure 10A:
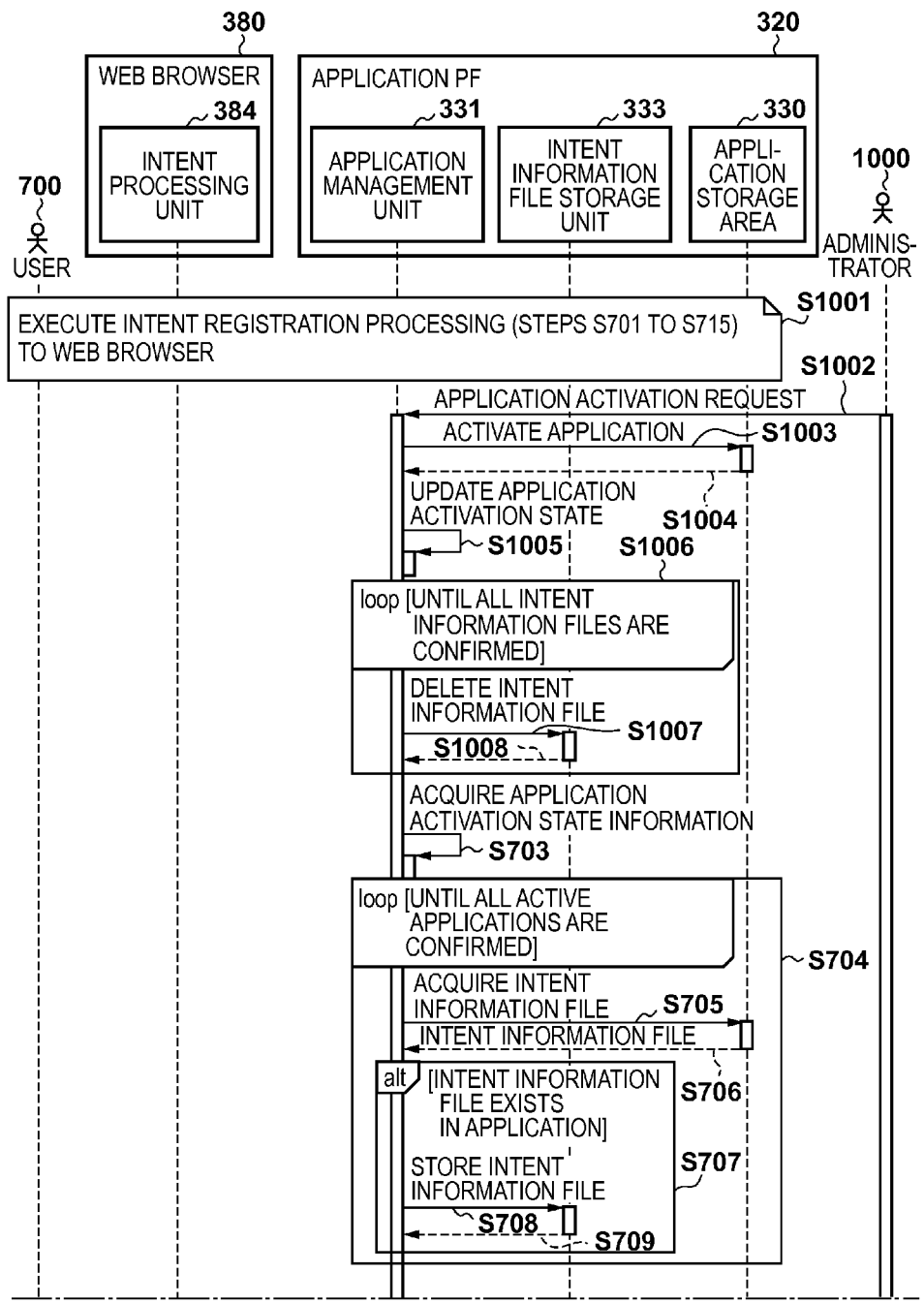

FIGS. 10A and 10B show a sequence chart of the Intent registration update processing procedure of the Web browser 380 according to this embodiment.

In step S1001, the processing of the sequence shown in FIG. 7 is executed. That is, in step S1001, the Intent registration operation at the time of activation of the Web browser 380 according to the first embodiment is performed, and Intent information shown in FIG. 8 is registered in an Intent information table 800 of an Intent table 385.

In step S1002, an administrator 1000 performs application life cycle management (installation, activation, stop, update, and uninstallation) on the application PF 320. In this embodiment, the administrator 1000 requests activation of an application B 360 that is in the stop state in the first embodiment.

In steps S1003 and S1004, the application PF 320 performs activation processing of the application B 360 via an application management unit 331. In step S1005, an application management table 332 is updated. With this processing, a state 502 of the application B in the application management table 332 shown in FIG. 5 is updated to "ACTIVE".

In steps S1006 to S1008, the application management unit 331 deletes all Intent information files existing in an Intent information file storage unit 333.

Steps S703 to S709 are the same as steps S703 to S709 of FIG. 7. Intent information of each application whose state is active is thus newly registered in the Intent information file storage unit 333.

In step S1009, the application management unit 331 transmits a request to update the Intent table 385 to the Web browser 380. This request is transmitted to synchronize the Intent information files in the Intent information file storage unit 333 with the information registered in the Intent information table of the Intent table 385.

Steps S711 to S714 are the same as steps S711 to S714 of FIG. 7. The Intent information files in the Intent information file storage unit 333 are thus analyzed.

In step S1010, an Intent processing unit 384 compares the Intent information analyzed in steps S711 to S714 with the Intent information in the Intent information table 800 of the Intent table 385.

In step S715, if the analyzed Intent information does not exist in the Intent information table 800 of the Intent table 385, the Intent processing unit 384 registers it in the Intent table 385.

In step S1011, if the Intent information exists in the Intent information table 800 of the Intent table 385 as well, the Intent processing unit 384 overwrites and updates the information registered in the Intent table 385.

In steps S1012 and S1013, processing of deleting Intent information data that exists only in the Intent information table 800 of the Intent table 385 is executed.

With the above-described procedure, the Intent information files in the Intent information file storage unit 333 and the information registered in the Intent information table of the Intent table 385 are synchronized.

FIG. 11 shows the arrangement of the Intent table 385 after execution of the Intent registration update processing to the Web browser 380 by the sequence shown in FIGS. 10A and 10B. The Intent information table 800 of the Intent table 385 includes Intent information 1100 of the application B 360 in addition to the Intent information of an application A 350 and a service provider 370.

<Example of Screen Transition in Application Cooperation>

FIG. 12 is an explanatory view of the arrangement and screen transition of a client application 392 executed when the Web browser 380 performs application cooperation using an Intent. Note that a menu screen 901 and data that forms the client application 392 are the same as in the first embodiment. When the user presses the print button on the menu screen 901, the Web browser 380 makes a transition to a print application selection screen 1200. The print application selection screen 1200 has the same function as the print application selection screen 902. However, since the Intent information 1100 of the application B 360 is added to the Intent information table 800 of the Intent table 385 shown in FIG. 11, "print appli B" is displayed as a selectable application.

As described above, according to the second embodiment, when the activation state of an application on the application PF 320 has changed, the Web browser 380 can update the Intent registration information in synchronism with the change. Note that in this embodiment, an example has been presented in which after Intent registration update processing of the Web browser 380, the Web browser 380 executes the client application 392 and refers to the Intent registration information. However, the Intent registration update processing according to this embodiment may be done during execution of the client application 392. That is, when the sequence processing shown in FIGS. 10A and 10B is executed during execution of the client application 392, the Web browser 380 internally updates the Intent table 385 of the Intent processing unit 384. Hence, when the client application 392 uses the Intent registration information at the time of, for example, a transition from the menu screen 901 to the print application selection screen 1200, the updated Intent information table 800 of the Intent table 385 is reflected.

[Third Embodiment]

The third embodiment of the present invention will be described next. In the arrangement according to the first embodiment, the Web browser 380 does not access a URL designated for the Web application 310 and confirm whether the Web application 310 is active. For this reason, even when the Intent information file is acquired from the service provider 370, and Intent registration to the Web browser 380 is performed, a situation where the Web application 310 is not active may occur. In this case, the client application 392 displays the application as an executable application in the list, although it is in an inexecutable state. In the third embodiment, when performing Intent registration of a Web application 310 via an Intent information file, processing of confirming the activation state of the Web application 310 and then performing Intent registration is added. This will be described below with reference to FIGS. 13 to 18. First, the Intent registration processing procedure of a Web browser 380 according to this embodiment will be explained with reference to FIGS. 13 to 15.

<Intent Registration Update Processing of Web Browser>

Figure 13A:
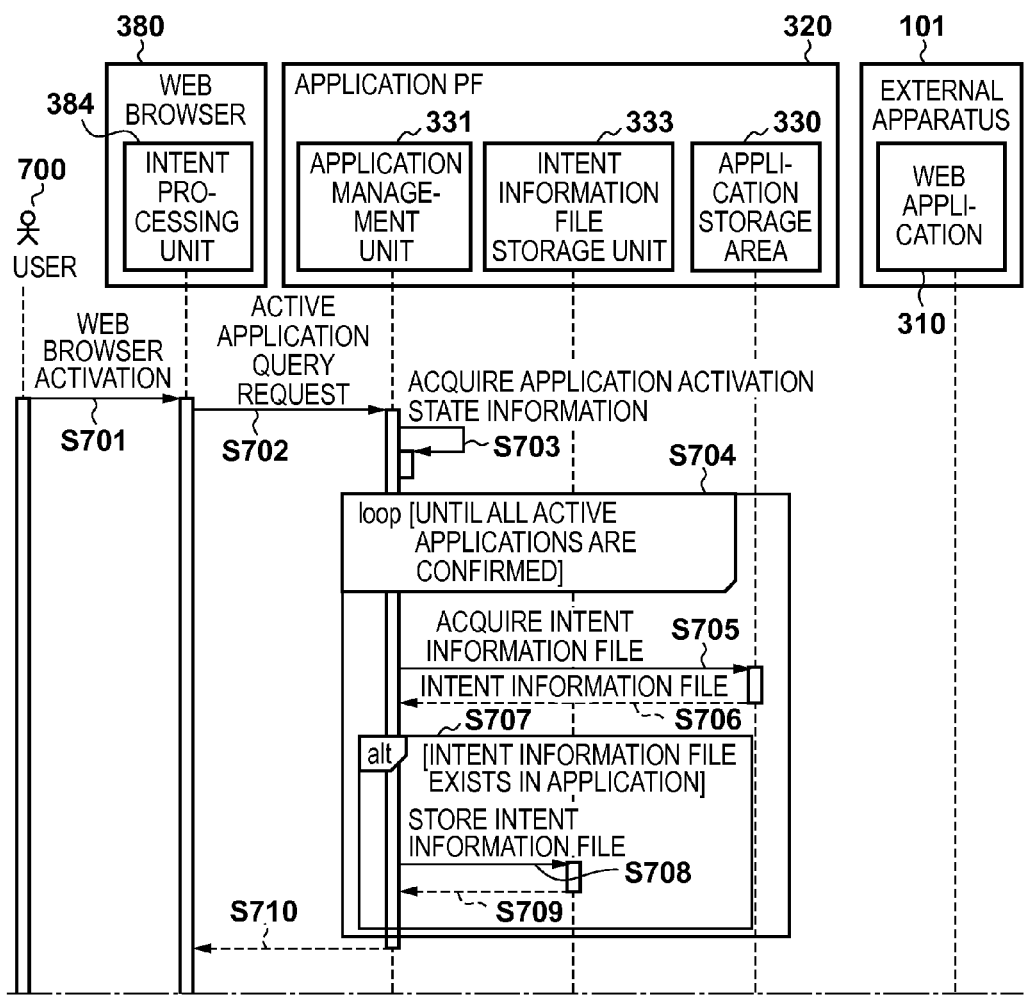
FIGS. 13A and 13B show a sequence chart of the Intent registration processing procedure of a Web browser according to the third embodiment.
Figure 13B:
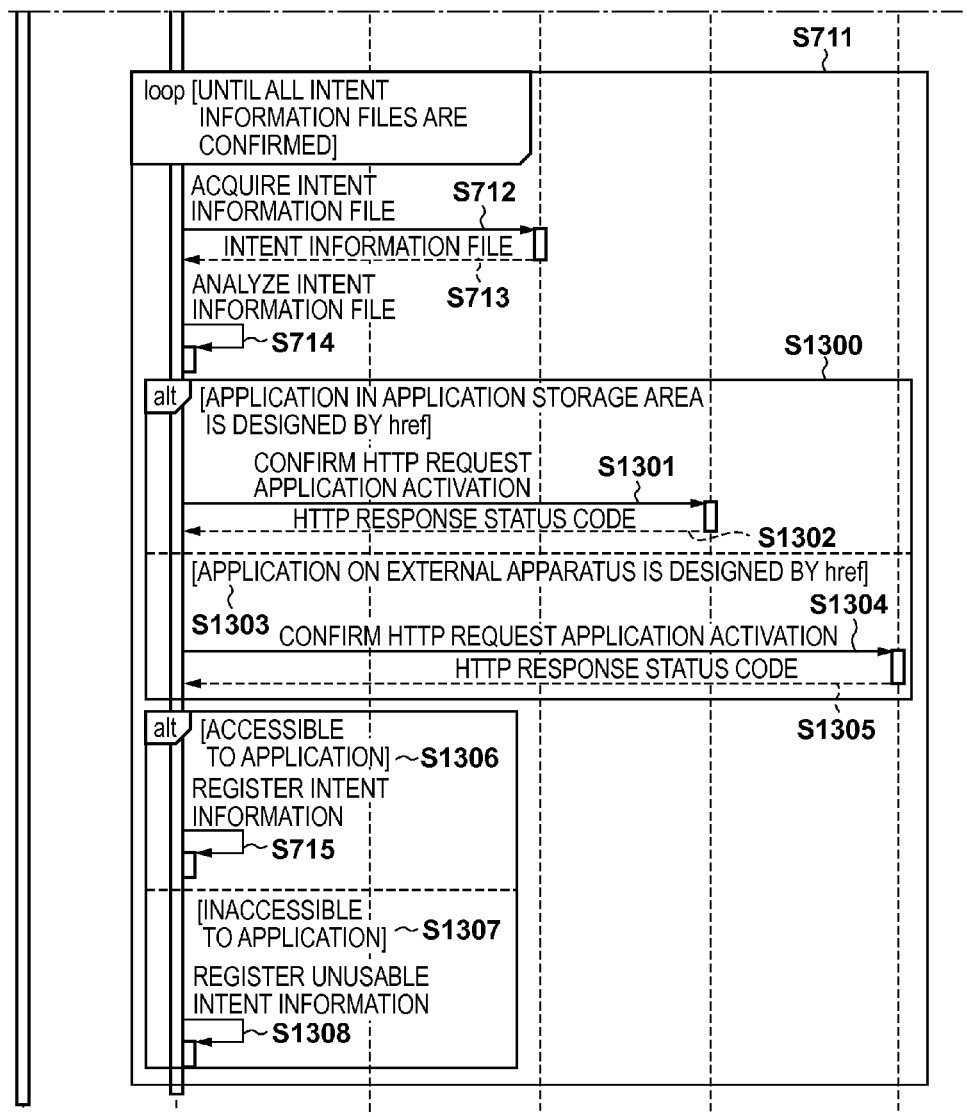

FIGS. 13A and 13B show a sequence chart of the Intent registration processing procedure of the Web browser 380. Steps S701 to S714 are the same as in FIG. 7, and a description thereof will be omitted. With this procedure, Intent information about each active application is registered in an Intent information file storage unit 333, and information registered in the Intent information table of an Intent table 385 is analyzed.

In steps S1300 to S1305, the Web browser 380 accesses a URL described in href of the Intent information file from an Intent processing unit 384 via a communication unit 381, and confirms activation of the Web application.

In the sequence chart of FIGS. 13A and 13B, the transmission destination of the Web application activation confirmation is specified as an application storage area 330 (S1300)/Web application 310 (S1303) according to the arrangement of the first embodiment. If another application is designated by the href in the Intent information file, the same processing is performed for the application designated by the href.

In this embodiment, activation confirmation is done for an application in the application storage area in steps S1301 and S1302 and for an application in the external apparatus in steps S1303 and S1304. As the Web application activation confirmation method, the Intent processing unit 384 transmits a request to confirm whether the application designated by the href is accessible by HTTP. The activation state is determined based on the response of an HTTP status code to the request processing. However, the configuration of activation confirmation processing of the step is not limited as long as the method can confirm the activation state of the URL designated by the href.

In steps S1306 and S1307, the Web browser 380 determines the result of Web application activation confirmation. If the application is active (step S1306), Intent information is registered in an Intent information table 800 of the Intent table 385 in step S715.

If the application is inaccessible, that is, the application is in a state other than the active state (step S1307), unusable Intent information is registered in an unusable Intent information table 1400 of the Intent table 385 in step S1308.

With the above-described procedure, the Intent information files in the Intent information file storage unit 333 and the information registered in the Intent information table of the Intent table 385 are synchronized. In addition, the pieces of Intent information registered in the Intent table 385 are divisionally registered for accessible applications and inaccessible applications.

Note that a case where the application activation request is received from an external system such as the Web application 310 has been described with reference to FIGS. 13A and 13B. When a stop request is received, the Intent information file is similarly updated.

The unusable Intent information table 1400 of the Intent table 385 according to this embodiment will be described here. FIG. 14 is a view showing the arrangement of the Intent table 385 according to this embodiment.

The Intent table 385 includes the Intent information table 800 and the unusable Intent information table 1400.

The Intent information table 800 has the same arrangement as the Intent table 385 shown in FIG. 8. Intent information in this table is recognized by the Intent processing unit 384 as Intent information registered in the Web browser 380.

The unusable Intent information table 1400 stores Intent information representing that the application designated by the href in the Intent information file is unusable. The unusable Intent information table 1400 manages action 1401, type 1402, title 1403, href 1404, and disposition 1405 as data items described in <intent> tag data in association with each other. Intent information stored in the unusable Intent information table 1400 is not recognized by the Intent processing unit 384 as Intent information registered in the Web browser 380.

Referring back to the sequence chart of FIG. 13B, when the process up to step S1308 is completed, and the remaining processes of the activation program of the Web browser 380 are completed, an image processing apparatus 100 activates the Web browser 380 and displays a screen via a UI display device 203. The arrangement of the Intent table 385 after execution of the Intent registration processing to the Web browser 380 by the sequence of FIGS. 13A and 13B will be described with reference to FIG. 14 described above. In this embodiment, assume that the Web browser 380 is activated, and the sequence processing shown in FIGS. 13A and 13B are performed in a state in which the Web application 310 is not active, in addition to the arrangement according to the first embodiment. That is, the Intent table 385 has, in the Intent information table 800, Intent information of an application A 350 and the like, which holds an Intent information file and is active. Intent information of an application B 360 that has an Intent information file but is inactive does not exist in the Intent information file storage unit 333 and is therefore not registered in the Intent table 385. Similarly, the Intent information of a Web server application 340 that is active but has no Intent information file does not exist in the Intent information file storage unit 333 and is therefore not registered in the Intent table 385. The Intent information of a service provider 370 stopped by the Web application 310 is stored in the unusable Intent information table 1400.

<Example of Screen Transition in Application Cooperation>

Figure 15:
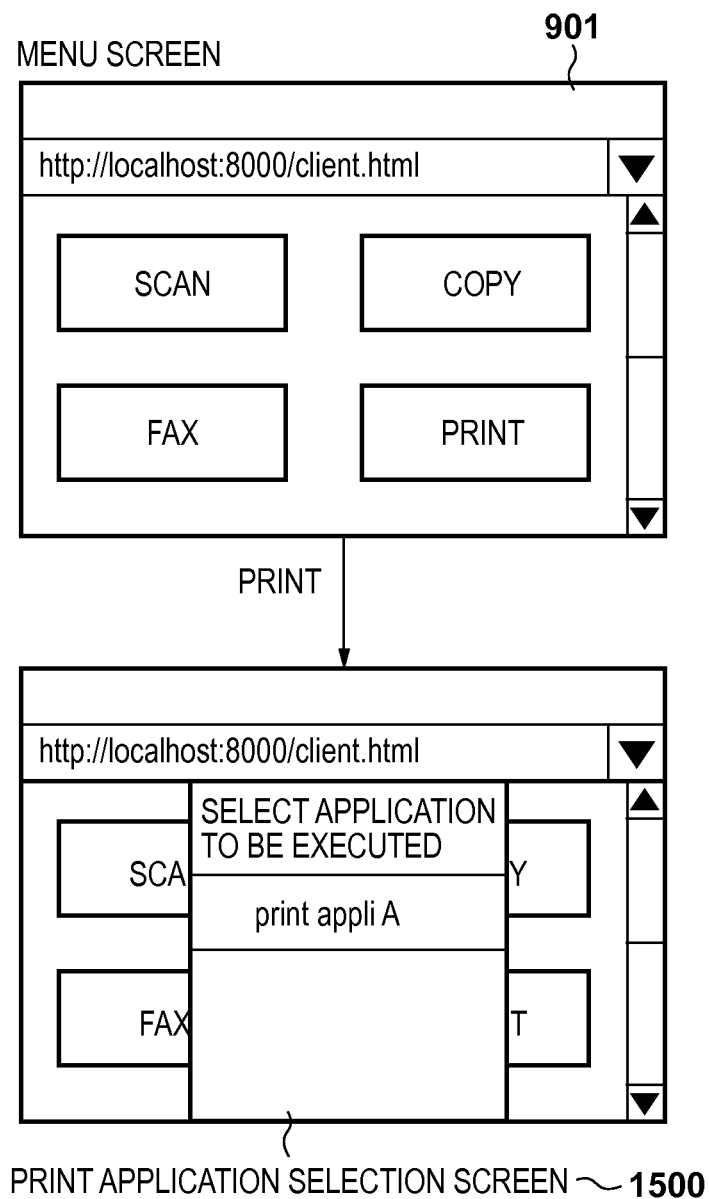
FIG. 15 is a view showing an example of a client application executed on the Web browser according to the third embodiment.

FIG. 15 is an explanatory view of an example of the arrangement and an example of screen transition of a client application 392 executed when the Web browser 380 performs application cooperation using an Intent. Note that a menu screen 901 and data that forms the client application 392 are the same as in the first embodiment.

When the user presses the print button on the menu screen 901, the Web browser 380 causes the client application 392 to make a transition to a print application selection screen 1500.

The print application selection screen 1500 has the same function as the print application selection screen 902. However, since the Intent information of the application A 350 is registered in the Intent information table 800 of the Intent table 385 shown in FIG. 14, only "print appli A" is displayed as a selectable application.

<Intent Registration Information Update Processing according to Query to Application>

Intent registration information update processing after completion of Intent registration processing will be described next with reference to FIGS. 16 to 18. Intent registration information update processing for an application registered in the unusable Intent information table 1400 of the Intent table 385 will be described first with reference to FIGS. 16 and 17. Note that in this embodiment, processing under a condition that the Intent table shown in FIG. 14 is held after completion of activation of the Web browser 380, and the Web application 310 is then updated to a usable state will be described.

Figure 16:
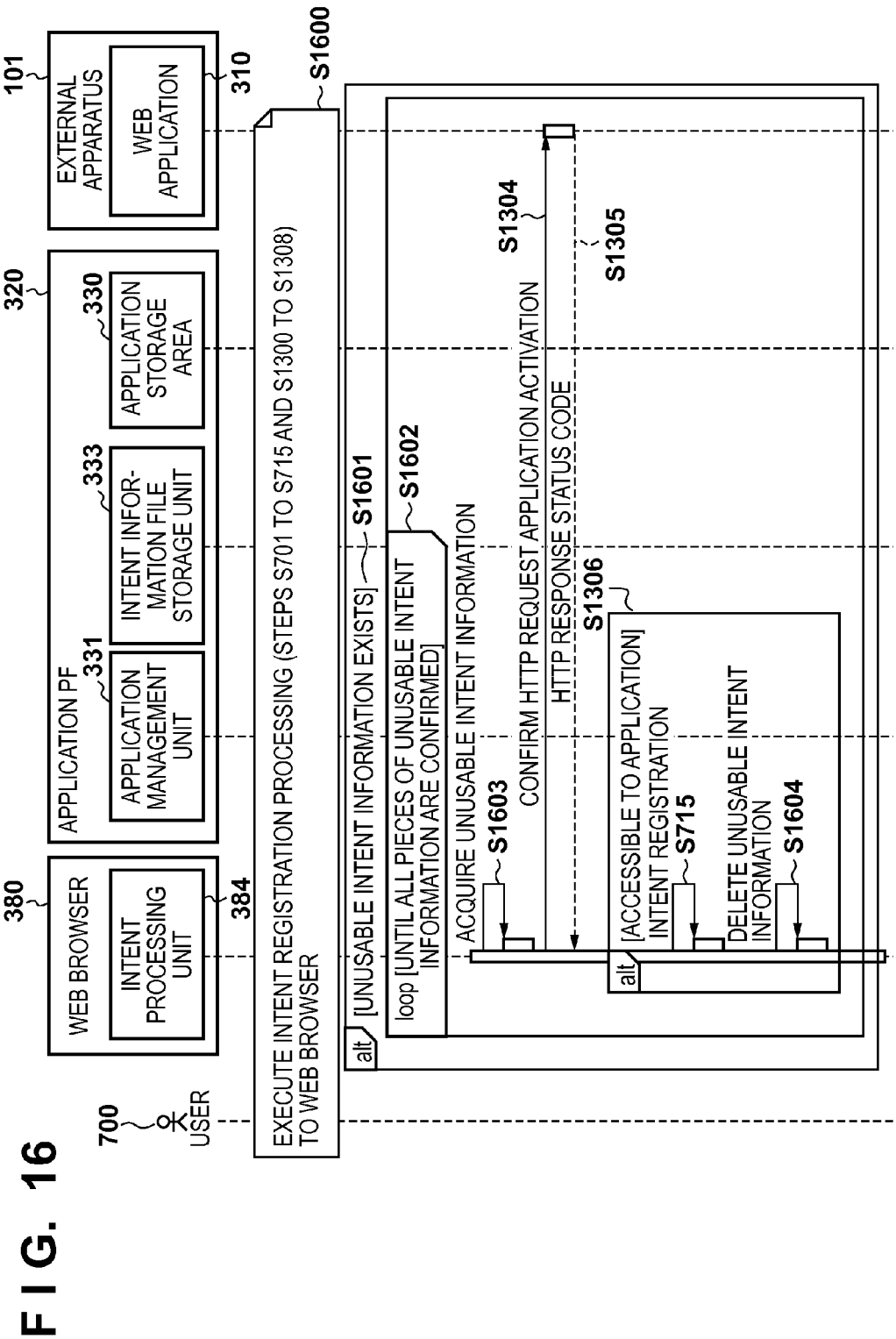
FIG. 16 is a sequence chart showing Intent registration update (upon activating a Web application) processing of the Web browser according to the third embodiment.

FIG. 16 is a sequence chart showing a procedure of updating the Intent table 385 when the Web application 310 in the stop state is activated as Intent registration update processing of the Web browser 380. That is, a procedure of updating the Intent table 385 when Intent information exists in the unusable Intent information table 1400 will be described.

In step S1600, the sequence processing shown in FIGS. 13A and 13B is executed. That is, in step S1600, the image processing apparatus 100 has the same state as that after execution of the sequence processing of FIGS. 13A and 13B.

In step S1601, the Web browser 380 periodically confirms via the Intent processing unit 384 whether Intent information exists in the unusable Intent information table 1400 of the Intent table 385.

If Intent information exists in the unusable Intent information table 1400, the Intent processing unit 384 performs update confirmation for all pieces of unusable Intent information in step S1602.

In step S1603, the Intent processing unit 384 acquires unusable Intent information in the Intent table 385.

Steps S1304 and S1305 and steps S1306 and S715 are the same as steps S1304 and S1305 and steps S1306 and S715 in FIG. 13B. That is, in step S715, usable Intent information is registered.

In step S1604, the Intent processing unit 384 deletes the unusable Intent information in the unusable Intent information table of the Intent table 385 acquired in step S1603.

FIG. 17 shows the arrangement of the Intent table 385 after execution of the Intent registration update processing to the Web browser 380 by the sequence of FIG. 16. As the result of execution of the sequence processing shown in FIG. 16, Intent information 1700 of the service provider 370 corresponding to the activated Web application 310 is added to the Intent information table 800 of the Intent table 385. On the other hand, the Intent information 1700 of the service provider 370 is deleted from the unusable Intent information table 1400 of the Intent table 385. With the above-described processing, when the Web browser 380 according to this embodiment performs application cooperation by the Intent, the arrangement and the example of screen transition of the client application 392 to be executed are the same as in FIG. 9.

<Intent Registration Information Update Processing according to Notification from Application>

Intent registration information update processing for an application registered in the Intent information table 800 of the Intent table 385 will be described next with reference to FIG. 18. Note that in this embodiment, processing under a condition that the Intent table 385 shown in FIG. 17 is obtained by performing sequence processing shown in FIG. 16, and in this state, the Web application 310 is updated to an unusable state will be described. FIG. 18 is a sequence chart showing a procedure of updating the Intent table 385 when the active Web application 310 is stopped as Intent registration update processing of the Web browser 380 according to this embodiment. That is, a procedure of updating the Intent table 385 when Intent information exists in the Intent information table 800 will be described.

In step S1800, the sequence processing shown in FIG. 16 is executed. That is, in step S1800, the image processing apparatus 100 has the same state as that after execution of the sequence processing of FIG. 16. Note that in step S1800, the sequence shown in FIGS. 13A and 13B may be executed in place of the sequence of FIG. 16.

In step S1801, when the active Web application 310 is stopped, it notifies the Web browser 380 communicating with the Web application 310 that the Intent information is unusable. Note that in this embodiment, the Web application 310 has a function of performing notification processing to the Web browser 380 of cooperation source upon stop processing, and the Intent processing unit 384 of the Web browser 380 has a function of receiving the notification. The arrangement of the notification function is not limited as long as it is a protocol capable of communicating from the Web application 310 to the Intent processing unit 384 of the Web browser 380, and it is also possible to uniquely specify the stop notification of the Web application 310. For example, a socket communication server processing function may be implemented in the Intent processing unit 384. On the side of the Web application 310, the IP address of the image processing apparatus 100 to which a connection request is transmitted by an HTTP Request may be stored, and socket communication data may be transmitted to the IP address when executing stop processing. After that, the Intent processing unit 384 may receive the communication data.

In step S1802, the Web browser 380 searches the Intent information table 800 of the Intent table 385 for href 804 that matches the URL of the Web application 310 as the notification source via the Intent processing unit 384. Intent information having the href 804 that matches the URL is acquired from the Intent information table 800 as the search result. In the example of this embodiment, the Web application 310 transmits the URL character string of the Web application 310 as socket communication data, and the Intent processing unit 384 analyzes the data and searches the Intent information table 800 based on the analyzed URL.

In step S1803, the Intent processing unit 384 stores the Intent information acquired in step S1802 in the unusable Intent information table 1400 of the Intent table 385.

In step S1804, the Intent processing unit 384 deletes the Intent information acquired in step S1802 from the Intent information table 800 of the Intent table 385.

Figure 18:
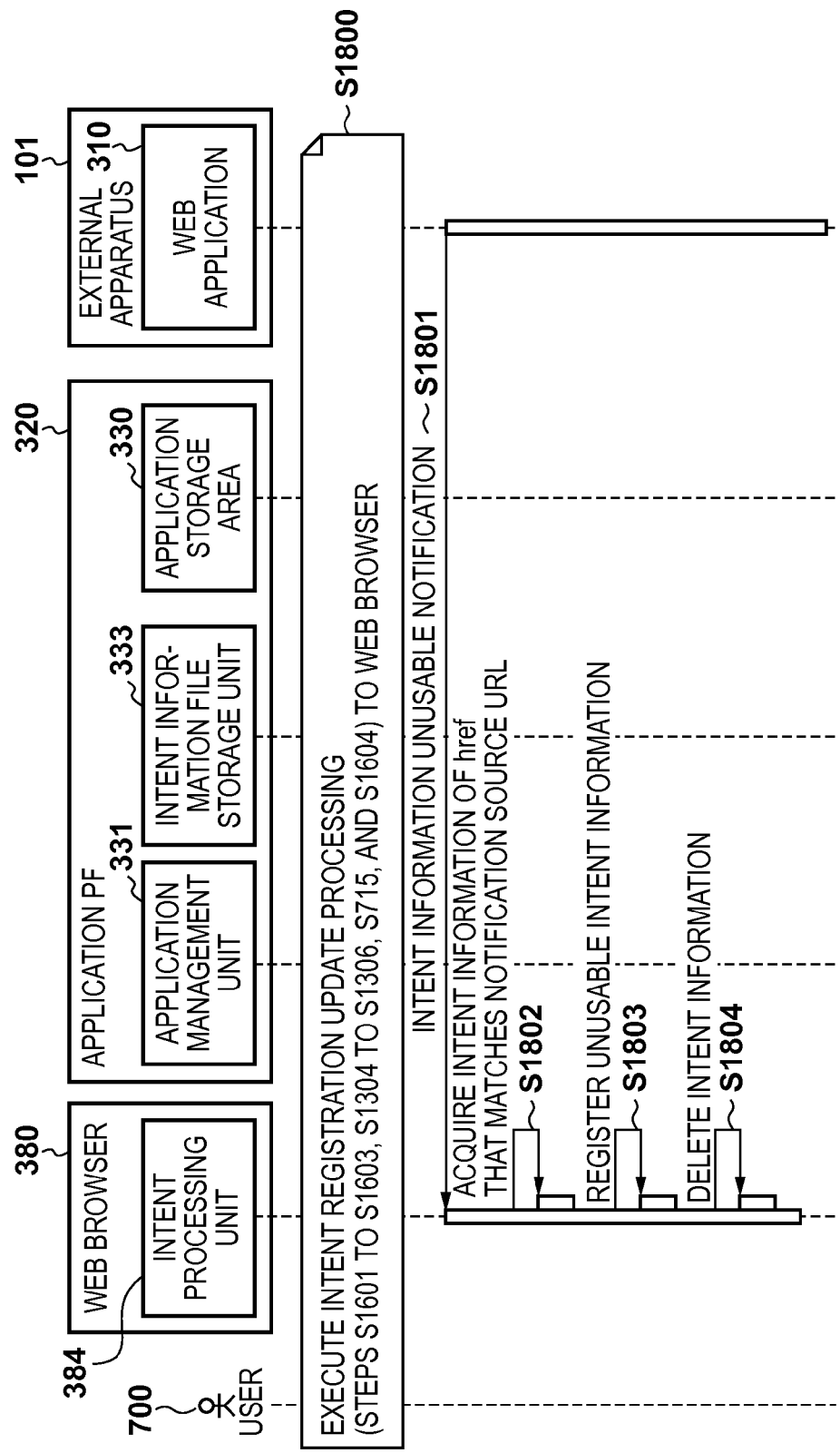
FIG. 18 is a sequence chart showing Intent registration update (upon stopping a Web application) processing of the Web browser according to the third embodiment.

The arrangement of the Intent table 385 after execution of the Intent registration update processing to the Web browser 380 by the sequence of FIG. 18 is the same as in FIG. 14. As the result of execution of the sequence processing of FIG. 18, the Intent information 1700 of the service provider 370 corresponding to the newly stopped Web application 310 is deleted for the Intent information table 800 of the Intent table 385. On the other hand, the Intent information 1700 of the service provider 370 is added to the unusable Intent information table 1400 of the Intent table 385. With the above-described processing, when the Web browser 380 according to this embodiment performs application cooperation by the Intent, the arrangement and the example of screen transition of the client application 392 to be executed are the same as in FIG. 15.

The Intent registration information update processing procedure of the Web browser 380 according to this embodiment has been described above. Using the third embodiment, when the activation state of the Web application 310 has changed, the Web browser 380 can register and update Intent registration information in synchronism with the change.

[Fourth Embodiment]

The fourth embodiment of the present invention will be described next. Some image processing apparatuses have a user authentication function using input of a user name and password, an authentication card, or the like. In such an image processing apparatus, for example, limit information of roles or usable device functions is additionally registered in an authentication database that stores the user name and password used by the user authentication function. This enables an operation of limiting applications usable by a user when the user logs in. When processing according to the first embodiment is added to the image processing apparatus, a use limitation is imposed on applications on the application PF 320 by user authority information. However, no use limitation is considered for the information of Intent information files. That is, the Web browser 380 may perform Intent registration of an application via an Intent information file even if the user has no authority to use the application. In the fourth embodiment, an image processing apparatus 100 having the authentication function adds an authentication information file to an application installed on an application PF 320. Processing of comparing user authority information and the authentication information file at the time of Intent registration to a Web browser 380 and performing Intent registration if the authorities match. This will be described below with reference to FIGS. 19 to 27. A procedure of Intent registration to the Web browser 380 according to this embodiment will be explained first with reference to FIGS. 19 to 25.

<Software Configuration>

Figure 19:
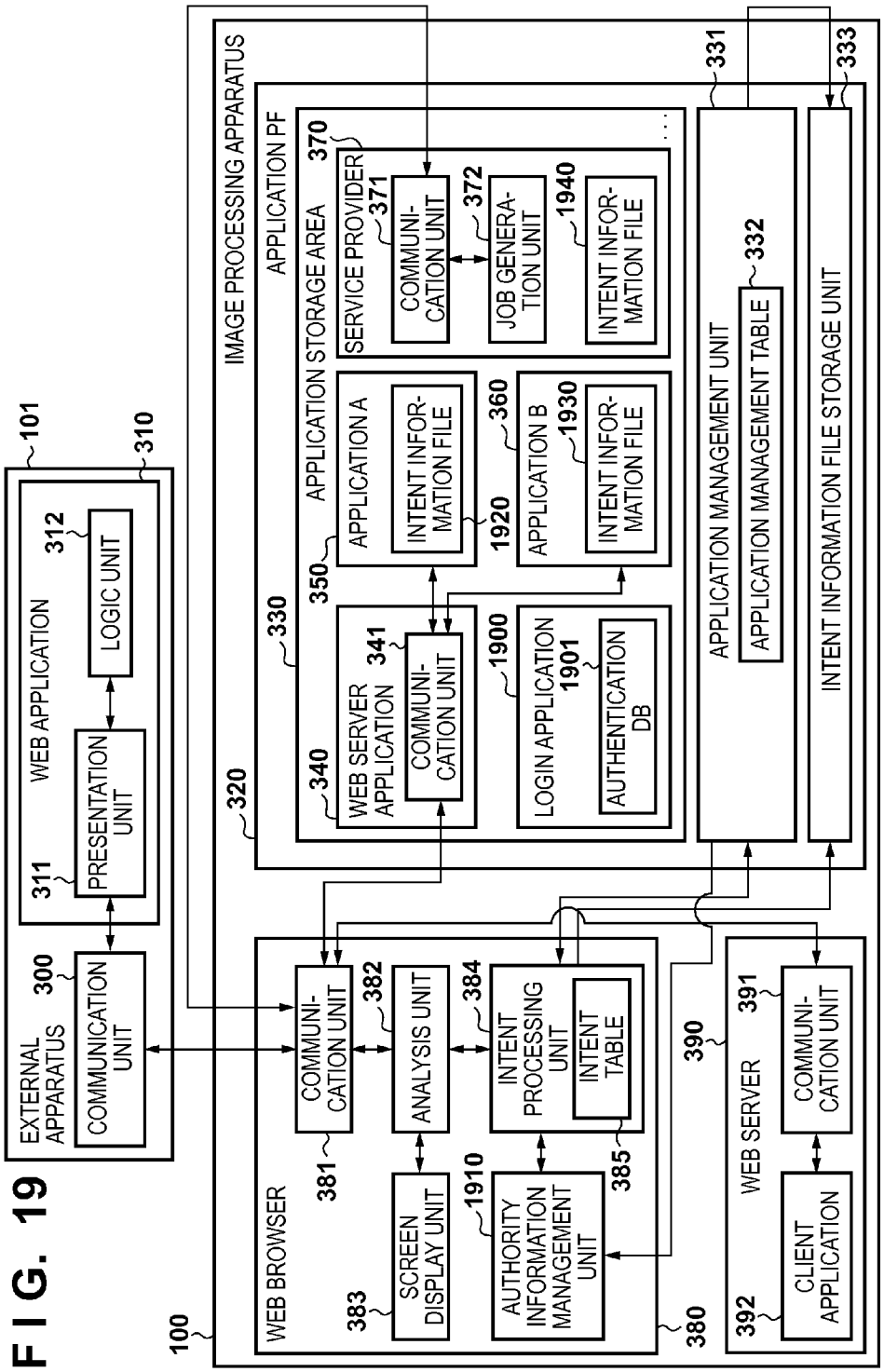
FIG. 19 is a block diagram showing the software configuration of an image processing apparatus according to the fourth embodiment.

FIG. 19 is a block diagram showing an example of the software configurations of an external apparatus and an image processing apparatus according to this embodiment. Each functional unit shown in FIG. 19 is implemented by causing a CPU 204/CPU 212 of the image processing apparatus 100/external apparatus 101 to read out a control program stored in a storage device 208/storage device 214 onto a RAM 205/RAM 213 and execute it. Only difference functions in FIG. 19 will be explained below.

A login application 1900 is an application that performs processing concerning user authentication in the image processing apparatus 100. The login application 1900 includes an authentication DB 1901. The authentication DB 1901 includes the authentication information of each user such as a user name and password, and authority information. The authority information registers the role (general user, administrator, or the like) of each user and usable device functions.

Each user can use only functions limited by the authority information in accordance with his/her authority. For example, when authority information designates a user role "administrator" for an application that implements a copy function, a user having a role of "general user" as authority information cannot use the application even when he/she logs in to the image processing apparatus 100.

The login application 1900 displays an authentication screen on a UI display device 203 of the image processing apparatus 100 and receives authentication information via a user input device 202. The login application 1900 collates the received authentication information with the authentication information of each user registered in the authentication DB 1901 and executes authentication. When authentication has succeeded, the login application 1900 acquires authority information from the authentication DB 1901 and transmits the information to an application management unit 331 and an authority information management unit 1910.

The authority information management unit 1910 has a function of managing the authority information of a current login user in the Web browser 380. The authority information management unit 1910 also receives authority information transmitted from the login application 1900 and enables only functions limited by the information.

Intent information files 1920, 1930, and 1940 include the same information as the Intent information files 351, 361, and 373. In this embodiment, the Intent information files 1920, 1930, and 1940 also include user authority information. The arrangements of the files will be described later with reference to FIGS. 22A, 22B, and 22C.

<Application Management Table>

FIG. 20 is a view showing an application management table 332 according to this embodiment. The application management table 332 manages the same information as that shown in FIG. 5. In this embodiment, the login application 1900 is registered as "LoginApplication" in a bundle 501. Pieces of information of the login application 1900 are registered in a table column 2000. All applications registered in the application management table 332 have a state 502 "ACTIVE", that is, all applications are active.

<Login Procedure>

FIG. 21 is a flowchart showing user authority transition using the login application 1900 according to this embodiment. The login procedure by the login application 1900 and transition of a user authority state in the application PF 320 and the Web browser 380 will be described with reference to FIG. 21.

After activation of the image processing apparatus 100, in step S2101, the application PF 320 initializes authority information existing in the application management unit 331 and sets an authority absent state. The authority absent state represents a user non-login state where no authority information exists at all. Hence, in the authority absent state, a user 2100 can use only applications other than those having functions limited by authority information in the application PF 320.

In step S2102, the Web browser 380 initializes authority information existing in the authority information management unit 1910 and sets an authority absent state. In the authority absent state, the user can use only functions other than those limited by authority information in the Web browser 380.

In step S2104, the application PF 320 performs login request reception wait processing via the login application 1900 and waits until a login request instruction from the user 2100 in step S2103 is received. In this embodiment, the login application 1900 provides a function of displaying a user name/password input screen on the UI display device 203 of the image processing apparatus 100 and receiving the information by the login request via the user input device 202 (not shown). However, the arrangement of the login application 1900 is not limited as long as it has an authentication function capable of uniquely specifying a user. For example, it may be an application function of connecting a card reader as the user input device 202 and reading and authenticating information of an authentication card.

In step S2105, the application PF 320 performs authentication determination of the login request received via the login application 1900. More specifically, this processing is performed by collating the login request information with authentication information registered in the authentication DB 1901 and determining whether the request is correct.

Upon determining that the login request is correct, the login application 1900 acquires the authority information of the user 2100 registered in the authentication DB 1901 in step S2106. In this embodiment, the user 2100 has a role "GeneralUser" as the authority information and can use limited functions designated for the role "GeneralUser" and functions usable in the authority absent state.

In step S2107, the application management unit 331 updates the authority information held by it to the authority information of the user 2100 using the authority information of the login user acquired from the login application 1900.

In step S2108, the application PF 320 transmits the authority information of the login user held by the application management unit 331 to the authority information management unit 1910 as an update notification to the Web browser 380.

In step S2109, the Web browser 380 updates the authority information in the authority information management unit 1910 to the notified authority information of the login user. In this embodiment, the authority information is updated to that of the user 2100. That is, the role of the authority information changes from "no designation" to "GeneralUser" so that the user can use limited functions designated for the role "GeneralUser" and functions usable in the authority absent state.

When the login user has logged out, the login application 1900 transmits the authority information initialization request to the application management unit 331 and the authority information management unit 1910 in a similar manner (not shown). The outline will be described below.

After login of the user 2100, a logout request is input via the login application 1900. Upon receiving the logout request, the login application 1900 transmits the authority information initialization request to the application management unit 331 and the authority information management unit 1910.

The application management unit 331 and the authority information management unit 1910 receive the initialization request, initialize the authority information held by them, and update it to the authority absent state.

<Intent Information File Including Authority Information>

FIGS. 22A, 22B, and 22C show examples of Intent information files held by the applications according to this embodiment. FIG. 22A shows an example of the Intent information file 1920 held by an application A 350.

The Intent information file 1920 includes <intent> tag data 600, and its data items are the same as those of the Intent information file 351 shown in FIG. 6A. The Intent information file 1920 also includes <permission> tag data 2200 representing authority information.

The <permission> tag data 2200 describes the authority information of the application A 350. This authority information is the same as the authority information managed by the login application 1900 and designates the role of each user, a usable device function, and the like. In this embodiment, the Intent information file 1920 designates a role 2201 as the <permission> tag data 2200. The role 2201 is an item representing the role of a user and designates no designation (authority absent/non-login user), GeneralUser (general user), Administrator (administrator), or the like. In this embodiment, since Administrator is designated as the role 2201, the application A 350 is used only by a user having an administrator authority.

FIG. 22B shows an example of the Intent information file 1930 held by an application B 360. The Intent information file 1930 includes <intent> tag data 610, and its data items are the same as those of the Intent information file 361 shown in FIG. 6B. The Intent information file 1930 includes no <permission>tag data. This indicates that no authority is needed to use the application B 360, and the application B 360 is usable even when a user is in a non-login state.

FIG. 22C shows an example of the Intent information file 1940 held by a service provider 370.

The Intent information file 1940 includes <intent> tag data 620, and its data items are the same as those of the Intent information file 373 shown in FIG. 6C. The Intent information file 1940 also includes <permission> tag data 2210. In this embodiment, the Intent information file 1940 includes a designation of GeneralUser in a role 2211 as the <permission> tag data 2210. That is, the service provider 370 and a Web application 310 are used only by a user having a general user authority.

Note that in this embodiment, <permission> tag data is added to the Intent information file as authority information. However, the arrangement is not limited as long as the data pairs off with the Intent information file and can be confirmed as authority information concerning the same application. For example, the data may be created as an authority information file, or <intent> tag data may include authority information tag data.

<Intent Registration Processing in Absence of Login User>

Figure 23A:
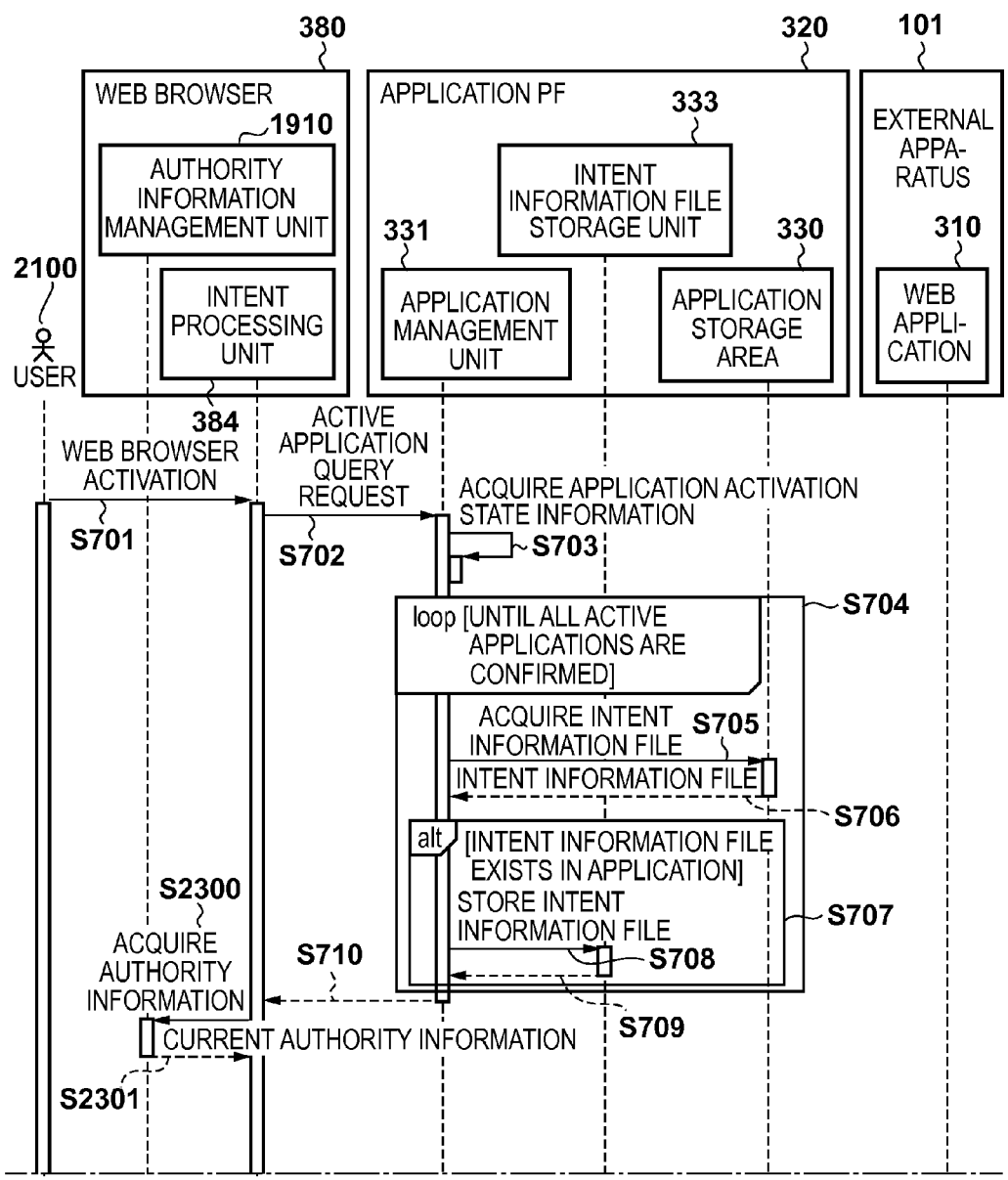
FIGS. 23A and 23B show a sequence chart of the Intent registration processing (non-login state) procedure of a Web browser according to the fourth embodiment.
Figure 23B:
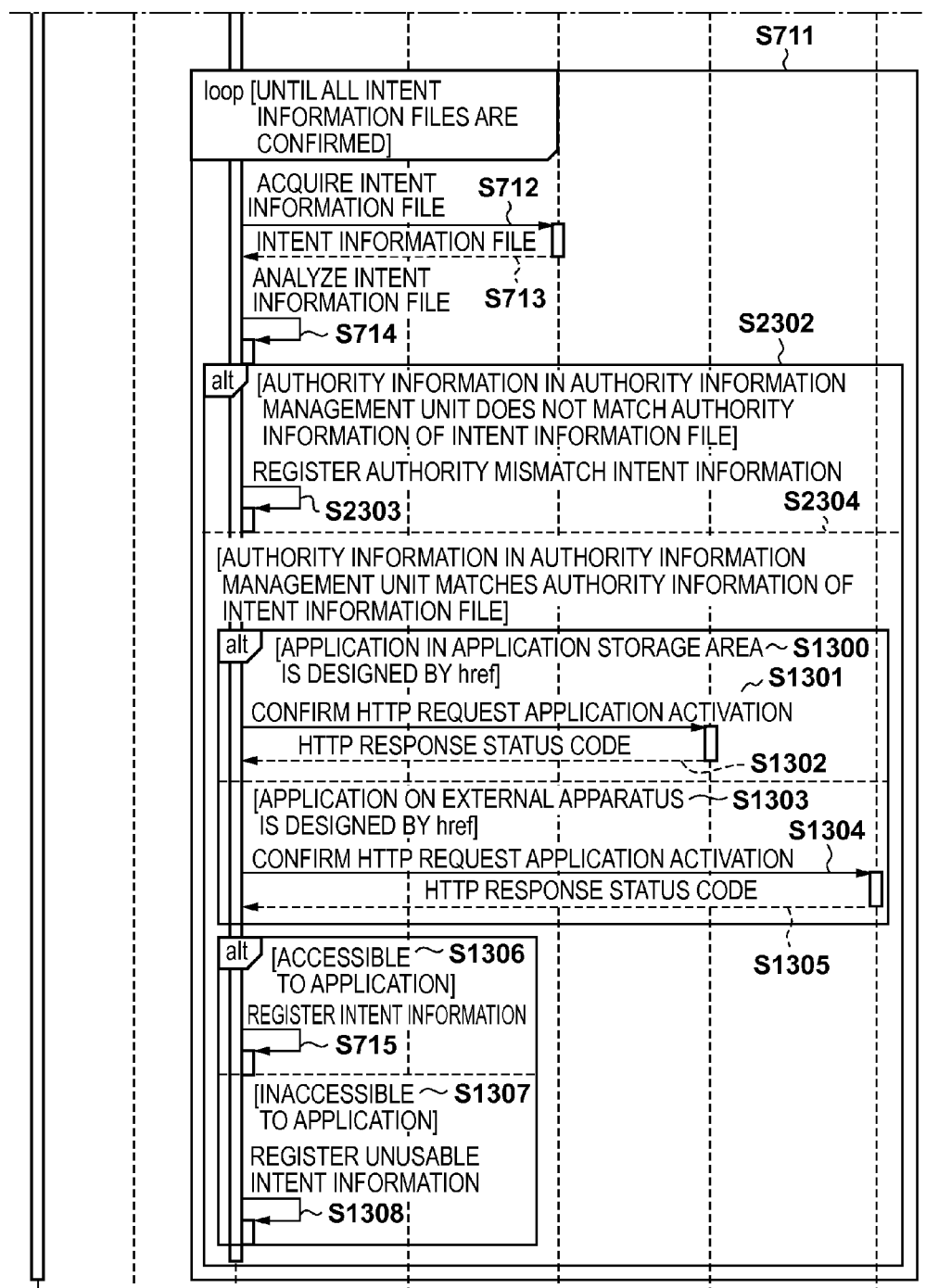

FIGS. 23A and 23B show a sequence chart of the procedure of Intent registration processing of the Web browser 380 according to this embodiment when a user is in a non-login state. This will be described below with reference to FIGS. 23A and 23B.

The processes of steps S701 to S710 are the same as those of steps S701 to S710 of FIG. 7. Intent information of each active application is thus registered in an Intent information file storage unit 333.

In steps S2300 and S2301, the Web browser 380 performs user authority information acquisition processing for the authority information management unit 1910 via an Intent processing unit 384. More specifically, since the user 2100 is in the non-login state, the Intent processing unit 384 acquires authority absent information as the authority information of the user.

The processes of steps S711 to S714 are the same as those of steps S711 to S714 of FIG. 7. Intent information of each application registered in the Intent information file storage unit 333 is thus analyzed.

In steps S2302 and S2303, the Intent processing unit 384 compares the authority information of the user acquired from the authority information management unit 1910 and the authority information of each application in the analyzed Intent information file. If the pieces of authority information do not match as the result of comparison, the Intent information is stored in an authority mismatch Intent information table 2410 of the Intent table 385. Note that a match includes not a perfect match but a state in which the authority given to the login user is equal to or higher than the authority that allows the user to use an application. That is, if the login user has the authority that allows him/her to use an application, it is determined as "authority match".

This also applies to the following description. Note that if the user has not logged in as in this example, the authority of the login user is "authority absent".

The authority mismatch Intent information table 2410 of an Intent table 385 according to this embodiment will be described here. FIG. 24 is a view showing the arrangement of the Intent table 385 according to this embodiment.

The Intent table 385 is formed from an Intent information table 800, an unusable Intent information table 1400, and the authority mismatch Intent information table 2410.

The Intent information table 800 includes authority information 2400 corresponding to Intent information, and stores authority information such as a role described in <permission> tag data analyzed by the Intent processing unit 384, in addition to the table arrangement shown in FIG. 8. The Intent information table 800 includes Intent information of an application for which the authority information of the login user matches the authority limited by the <permission> tag data, and the application designated by the href is active.

The Intent information in this table is recognized by the Intent processing unit 384 as Intent information registered in the Web browser 380.

The unusable Intent information table 1400 includes authority information 2401 corresponding to Intent information, like the Intent information table 800, in addition to the unusable Intent information table 1400 shown in FIG. 14. The unusable Intent information table 1400 includes the Intent information of an application for which the login user cannot access the application designated by the href even when his/her authority information matches the authority limited by the <permission> tag data. The Intent information stored in the unusable Intent information table 1400 is not recognized by the Intent processing unit 384 as Intent information registered in the Web browser 380. When the role 2401 is held in the unusable Intent information table 1400, for example, the Intent information can be moved from the unusable Intent information table 1400 to the Intent information table 800.

The authority mismatch Intent information table 2410 stores Intent information of an application that is unusable because the authority information of the login user does not match the authority described in the <permission> tag data corresponding to the Intent information. The authority mismatch Intent information table 2410 manages action 2411, type 2412, title 2413, href 2414, and disposition 2415 as data items described in <intent> tag data in association with each other. The authority mismatch Intent information table 2410 also holds authority information 2416 corresponding to Intent information and stores authority information such as a role described in <permission> tag data analyzed by the Intent processing unit 384. The Intent information described in the authority mismatch Intent information table 2410 is not recognized by the Intent processing unit 384 as Intent information registered in the Web browser 380.

Referring back to the processing of the sequence chart of FIG. 23B, step S2304 is processing performed when the Intent processing unit 384 compares the authority information of the user acquired from the authority information management unit 1910 and the authority information of the analyzed Intent information file, and the pieces of authority information match. Detailed processes are steps S1300 to S1308 and S715, which are the same as steps S1300 to S1308 and S715 of FIGS. 13A and 13B. That is, activation of each application for which the pieces of authority information match is confirmed. For an active application, the Intent information is registered in the Intent information table 800. For an inactive application, the Intent information is registered in the unusable Intent information table 1400.

The arrangement of the Intent table 385 after execution of the Intent registration processing to the Web browser 380 by the sequence of FIGS. 23A and 23B will be described with reference to FIG. 24. In this embodiment, the Intent table 385 registers, in the Intent information table 800, the Intent information of the application B 360 which has the Intent information file and for which the authority information represents no designation (that is, use by a user having no authority is permitted), by the sequence processing of FIGS. 23A and 23B. The pieces of Intent information of the application A 350 and the service provider 370, for which a user authority is designated by the <permission> tag data, are stored in the authority mismatch Intent information table 2410 because the authority information does not match because of the non-login state.

<Example of Screen Transition in Application Cooperation>

Figure 25:
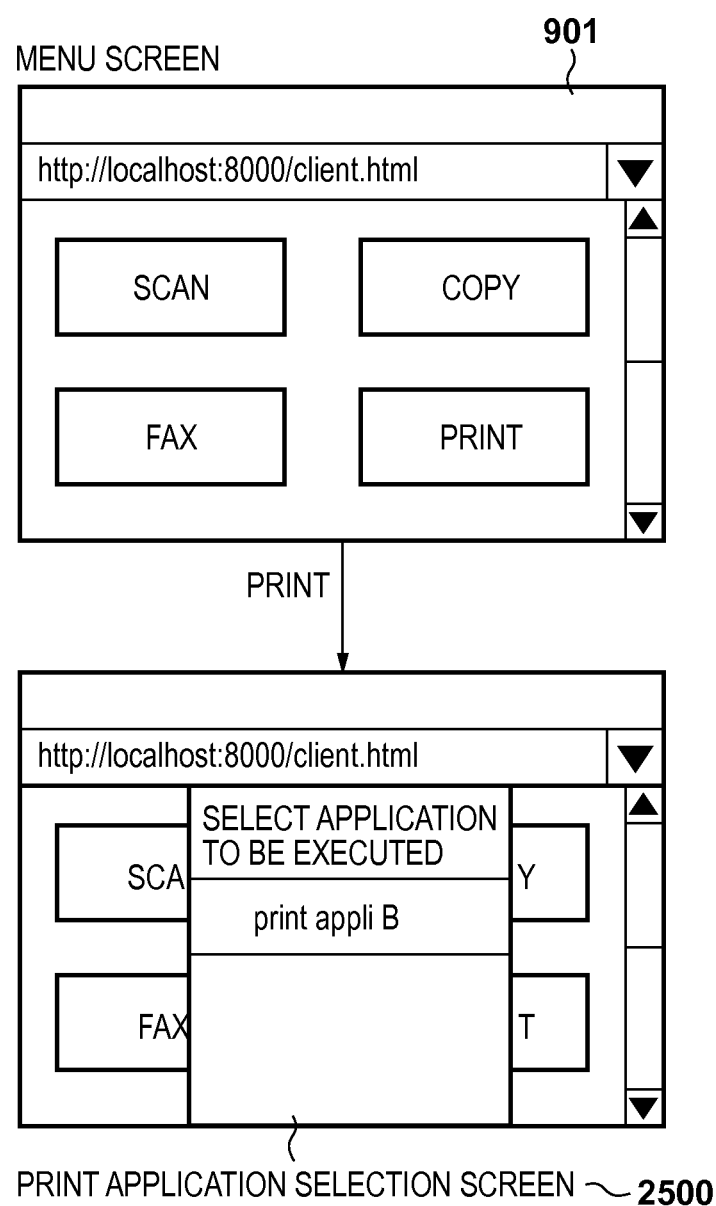
FIG. 25 is a view showing an example of a client application executed on the Web browser according to the fourth embodiment.

FIG. 25 is an explanatory view of an example of the arrangement and an example of screen transition of a client application 392 executed when the Web browser 380 according to this embodiment performs application cooperation using an Intent. Note that a menu screen 901 and data that forms the client application 392 are the same as in the first embodiment.

When the user presses the print button on the menu screen 901, the Web browser 380 makes a transition to a print application selection screen 2500.

The print application selection screen 2500 has the same function as the print application selection screen 902. However, since the Intent information of the application B 360 is registered in the Intent information table 800 of the Intent table 385 shown in FIG. 24, only "print appli B" is displayed as a selectable application.

<Intent Registration Update Processing>

Intent registration update processing procedure of the Web browser 380 in case where the user changes the login state via the login application 1900 for the image processing apparatus 100 will be described next with reference to FIGS. 26 and 27.

Figure 26A:
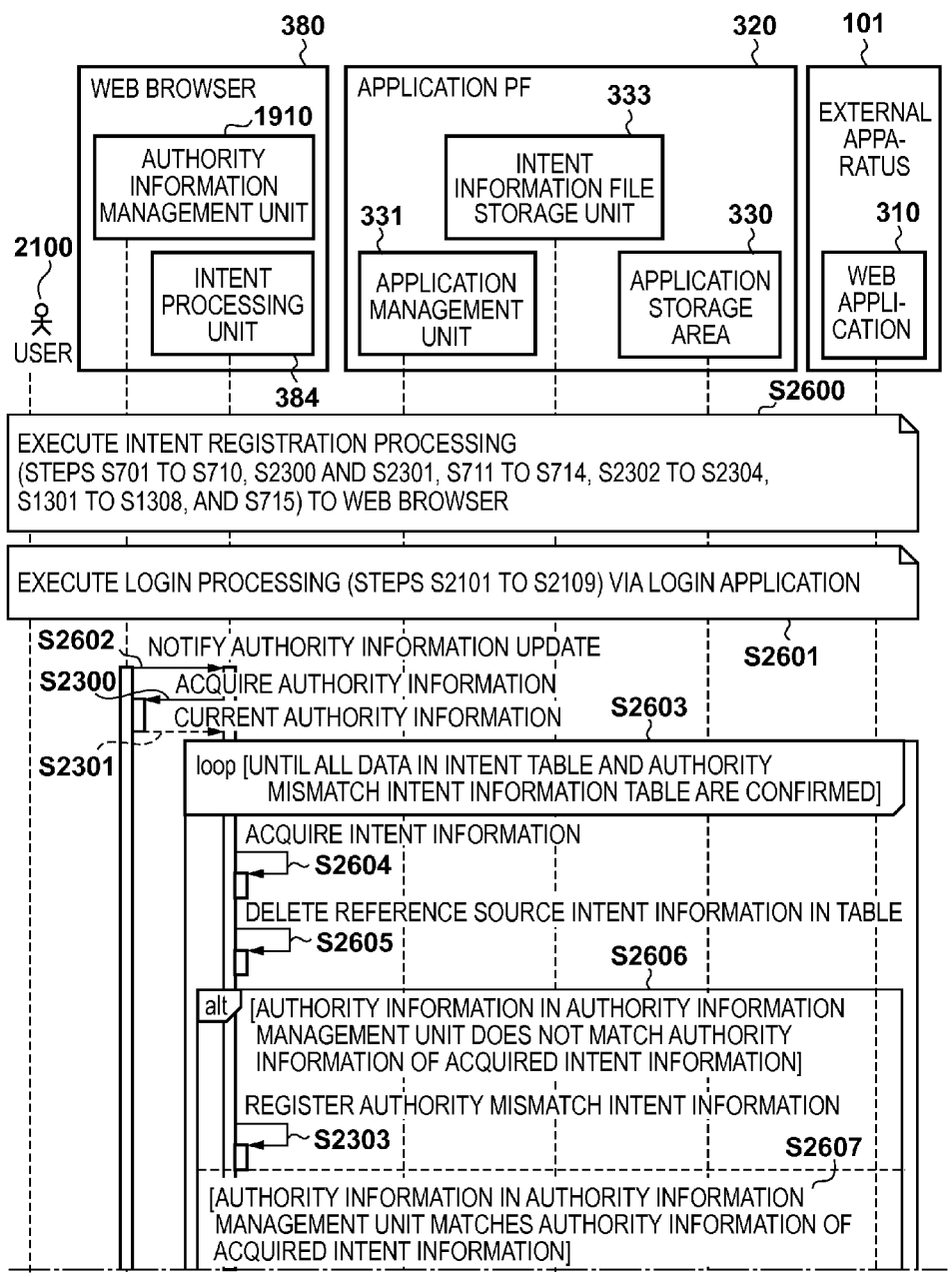
FIGS. 26A and 26B show a sequence chart of the Intent registration update processing (user login state) procedure of the Web browser according to the fourth embodiment.
Figure 26B:
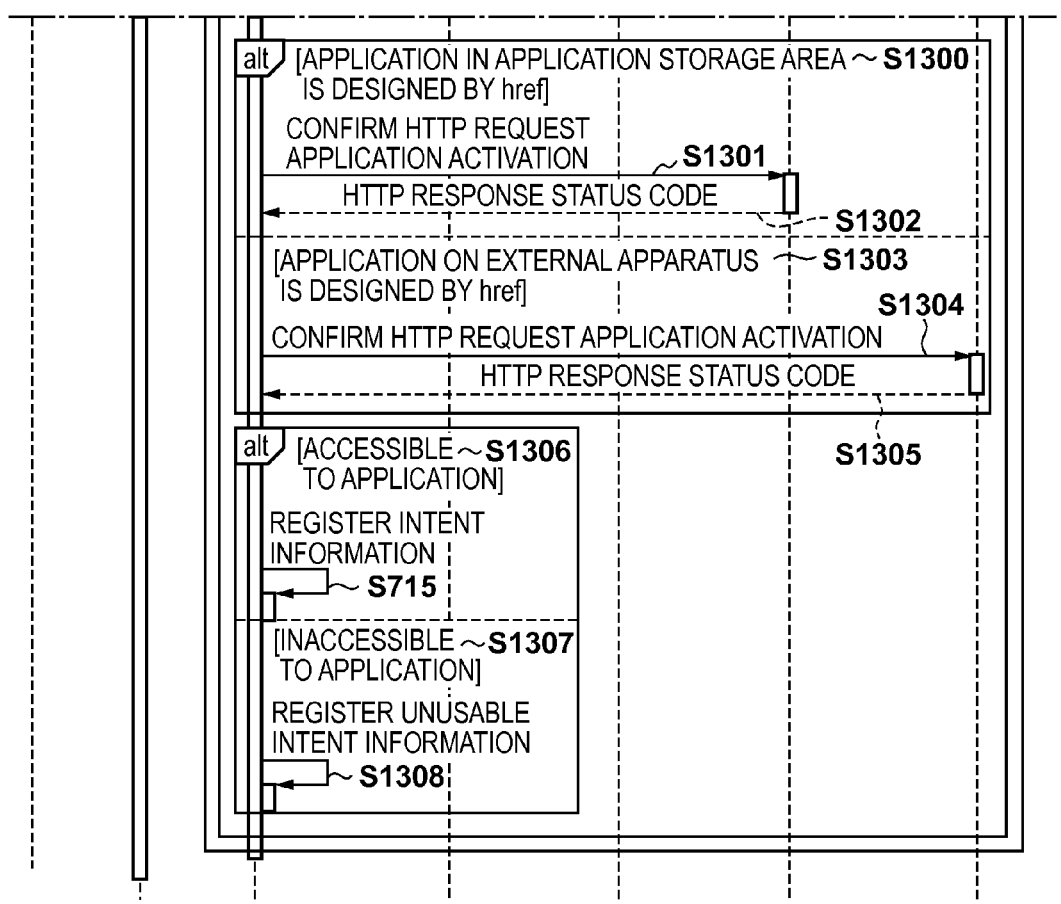

FIGS. 26A and 26B show a sequence chart of the update processing procedure in case where the user has logged in as the Intent registration update processing of the Web browser 380 according to this embodiment.

In step S2600, the sequence processing shown in FIGS. 23A and 23B is executed. That is, in step S2600, the image processing apparatus 100 has the same state as that after execution of the sequence processing of FIGS. 23A and 23B, and the Intent table 385 has the table state shown in FIG. 24.

In step S2601, the processing of the flowchart shown in FIG. 21 is executed. That is, in step S2601, the image processing apparatus 100 has the same state as that after execution of the processing of the flowchart shown in FIG. 21. Hence, the application management unit 331 and the authority information management unit 1910 have a state in which, for example, GeneralUser is designated in the role as the authority information of the user.

In step S2602, the authority information management unit 1910 of the Web browser 380 notifies the Intent processing unit 384 of update of the authority information of the user.

The processes of steps S2300 and S2301 are the same as those of steps S2300 and S2301 of FIG. 23A.

In step S2603, the Intent processing unit 384 confirms authority information for all pieces of Intent information in the Intent information table 800 and the authority mismatch Intent information table 2410 of the Intent table 385. More specifically, the confirmation is done by executing processing from step S2604.

In step S2604, the Intent processing unit 384 acquires Intent information in the Intent information table 800 or the authority mismatch Intent information table 2410. At this time, the Intent processing unit 384 also acquires counterpart authority information together with the Intent information.

In step S2605, the Intent processing unit 384 deletes Intent information stored in the table as the acquisition source of the acquired Intent information. At this time, the Intent processing unit 384 also deletes counterpart authority information together with the Intent information.

Step S2606 is processing performed when the Intent processing unit 384 compares the authority information of the user acquired from the authority information management unit 1910 and the authority information of the Intent information acquired in step S2604, and the pieces of authority information do not match. Detailed processing is step S2303, which is the same as step S2303 of FIG. 23B.

Step S2607 is processing performed when the Intent processing unit 384 compares the authority information of the user acquired from the authority information management unit 1910 and the authority information of the Intent information acquired in step S2604, and the pieces of authority information match. Detailed processes are steps S1300 to S1308 and S715, which are the same as steps S1300 to S1308 and S715 of FIGS. 13A and 13B.

<Example of Intent Table>

FIG. 27 is a view showing the arrangement of the Intent table 385 after execution of the Intent registration update processing to the Web browser 380 by the sequence of FIGS. 26A and 26B. In the Intent table 385, each application having an Intent information file and no designation or a role "GeneralUser" as authority information is registered in the Intent information table 800 by the sequence processing shown in FIGS. 26A and 26B. In addition to the application B 360, the Intent information and authority information of the service provider 370 indicated by 2700 are registered in the Intent information table 800. When the user 2100 logs in, the Intent information and authority information of the service provider 370 indicated by 2700 are registered deleted from the authority mismatch Intent information table 2410.

With the above-described processing, the arrangement and an example of screen transition of the client application 392 executed when the Web browser 380 performs application cooperation using an Intent are as follows (not shown).

When the menu screen 901 makes a transition to the print application selection screen (not shown), "print appli B" and "print appli SP" are displayed as selectable applications from the Intent information table 800.

The Intent registration information update processing of the Web browser 380 according to this embodiment in case where the user has logged in via the login application has been described above. In the fourth embodiment, the Web browser 380 can register and update Intent registration information in consideration of the authority information of the user. Note that in this embodiment, the authority information is added to the Intent information file, and the Web browser 380 confirms the user authority when registering Intent information. However, the operation of confirming the user authority may be done by the application management unit 331. That is, in active application confirmation processing (steps S703 to S709), the application management unit 331 may compare the authority information of the user acquired from the login application 1900 and authority information in each Intent information file. Only Intent information files for which the authority matches as the result of comparison may be stored in the Intent information file storage unit 333. Similarly, function limit information of an application using an Intent may be added to the authority information of the login application 1900. That is, a device function (for example, copy function or printer function) usable via the Intent function may be added to authority information in the authentication DB 1901 of the login application 1900. The authority information of a device function usable via the Intent function may also be added to the authority information of an application. In this case, for example, assume that the copy function is declared in the authority information item of the Intent function as the authority information of an application that implements the copy function. In this case, the application management unit 331 stores the Intent information of the application in the Intent information file storage unit 333 only when a user who has the copy function in the authority information item of the Intent function has logged in. Hence, the Intent processing unit 384 can acquire only the Intent information of usable applications and register only Intent information permitted as the authority information after confirming the authority information of the user.

Note that the present invention is not limited to the specifically disclosed embodiments, and various changes and modifications can be made without departing from the scope of the appended claims.

In the above-described embodiments, the Intent information table 800, the unusable Intent information table 1400, the authority mismatch Intent information table 2410, and the like are prepared as separate tables. However, they may be integrated into one table, and a field of information representing a usable, unusable, or authority absent state may be added to the Intent information of each application.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-022783, filed Feb. 7, 2014, which is hereby incorporated by reference herein in its entirety.

What is claimed is:

1. An information processing apparatus comprising:
a memory device; and
a processor in communication with the memory device, wherein the processor is configured to control a platform on which at least one application can operate, the platform comprising:
an acquisition unit that acquires an operation situation of the at least one application, wherein the acquired operation situation indicates one of first, second, and third situations, the first situation indicating that the at least one application has been installed, the second situation indicating that the at least one application has been activated after being installed, and the third situation indicating that the at least one application has been inactivated after being activated, due to a stop instruction; and a management unit that manages function information concerning a service provided by the at least one application in accordance with the operation situation, wherein, at the time of startup of a web browser, the management unit stores the function information concerning only applications for which the acquired operation situation indicates the second situation into a reference area of the web browser, wherein the management unit deletes all information in the reference area so that the function information corresponding to an inactive application is deleted, and then re-stores the function information corresponding to the application for which the operation situation indicates the second situation, simultaneously with the registration, by the web browser, of the function information corresponding to an activated application when the activated application is newly activated, wherein, upon designation of a function selecting object placed on a screen based on HTML data provided by a client application after registration of the function information in the reference area by the web browser has been executed, only a service provided by each activated application corresponding to the function information in the reference area is reflected to a list additionally displayed, and wherein the service corresponding to the function information is executed in accordance with receiving a call of the service via the list.

2. The apparatus according to claim 1, wherein the function information comprises Intent information associated with Web Intents.

3. The apparatus according to claim 1, wherein the operation situation is decided in accordance with communication with an external system that cooperates with the at least one application.

4. The apparatus according to claim 3, wherein the management unit updates the function information under management when the operation situation of the at least one application is changed by the communication with the external system.

5. The apparatus according to claim 1, wherein the management unit further manages authority information of a login user, and the function information of the at least one application further includes authority information of a user who can execute the at least one application.

6. The apparatus according to claim 1, wherein the calling system is included in the information processing apparatus, and the calling system acquires the function information from the management unit and manages the acquired function information for each operation situation of the at least one application.

7. The apparatus according to claim 6, wherein the calling system requests the operation situation of the at least one application from one of the platform and an external system, and updates the registered function information in accordance with the acquired operation situation.

8. The apparatus according to claim 5, wherein the calling system is included in the information processing apparatus, and the calling system acquires the function information and the authority information of the login user from the management unit, and manages the acquired function information in accordance with the operation situation of the at least one application and whether the at least one application can be executed by the authority of the login user.

9. The apparatus according to claim 8, wherein the calling system updates the function information acquired from the management unit in accordance with a change in the authority information of the login user.

10. A non-transitory computer-readable medium having recorded therein a program that causes a computer controlling a platform on which at least one application can operate to execute an information processing method, the method comprising:

acquiring an operation situation of the at least one application, wherein the acquired operation situation indicates one of first, second, and third situations, the first situation indicating that the at least one application has been installed, the second situation indicating that the at least one application has been activated after being installed, and the third situation indicating that the at least one application has been inactivated after being activated, due to a stop instruction; and managing function information concerning a service provided by the at least one application in accordance with the operation situation, wherein, at the time of startup of a web browser, the function information concerning only applications for which the acquired operation situation indicates the second situation is stored into a reference area of the web browser, wherein the managing step deletes all information in the reference area so that the function information corresponding to an inactive application is deleted, and then re-stores the function information corresponding to the application for which the operation situation indicates the second situation, simultaneously with the registration, by the web browser, of the function information corresponding to an activated application when the activated application is newly activated, wherein, upon designation of a function selecting object placed on a screen based on HTML data provided by a client application after registration of the function information in the reference area by the web browser has been executed, only a service provided by each activated application corresponding to the function information in the reference area is reflected to a list additionally displayed, and wherein the service corresponding to the function information is executed in accordance with receiving a call of the service via the list.

11. An information processing method of an information processing apparatus controlling a platform on which at least one application can operate, the method comprising:

acquiring an operation situation of the at least one application, wherein the acquired operation situation indicates one of first, second, and third situations, the first situation indicating that the at least one application has been installed, the second situation indicating that the at least one application has been activated after being installed, and the third situation indicating that the at least one application has been inactivated after being activated, due to a stop instruction; and managing function information concerning a service provided by the at least one application in accordance with the operation situation, wherein, at the time of startup of a web browser, the function information concerning only applications for which the acquired operation situation indicates the second situation is stored into a reference area of the web browser, wherein the managing step deletes all information in the reference area so that the function information corresponding to an inactive application is deleted, and then re-stores the function information corresponding to the application for which the operation situation indicates the second situation, simultaneously with the registration, by the web browser, of the function information corresponding to an activated application when the activated application is newly activated, wherein, upon designation of a function selecting object placed on a screen based on HTML data provided by a client application after registration of the function information in the reference area by the web browser has been executed, only a service provided by each activated application corresponding to the function information in the reference area is reflected to a list additionally displayed, and wherein the service corresponding to the function information is executed in accordance with receiving a call of the service via the list.

* * * * *